United States Patent
Swenson

(10) Patent No.: US 9,701,047 B2
(45) Date of Patent: Jul. 11, 2017

(54) METHODS AND SYSTEMS FOR THE PREPARATION OF MOLDED PLASTIC ARTICLES HAVING A STRUCTURAL BARRIER LAYER

(71) Applicant: MILACRON, LLC, Cincinnati, OH (US)

(72) Inventor: Paul M. Swenson, South Hamilton, MA (US)

(73) Assignee: Milacron LLC, Cincinnati, OH (US)

( * ) Notice: Subject to any disclaimer, the term of this patent is extended or adjusted under 35 U.S.C. 154(b) by 172 days.

(21) Appl. No.: 14/210,353

(22) Filed: Mar. 13, 2014

(65) Prior Publication Data

US 2014/0272222 A1    Sep. 18, 2014

Related U.S. Application Data

(60) Provisional application No. 61/798,376, filed on Mar. 15, 2013.

(51) Int. Cl.
 *B29C 45/16* (2006.01)
 *B29C 45/00* (2006.01)
 (Continued)

(52) U.S. Cl.
 CPC ...... *B29C 45/0046* (2013.01); *B29C 37/0082* (2013.01); *B29C 45/1642* (2013.01);
 (Continued)

(58) Field of Classification Search
 CPC .... B29C 2045/1614; B29C 2045/1648; B29C 45/0046; B29C 45/1642; B29C 45/1646; B29C 45/1657
 See application file for complete search history.

(56) References Cited

U.S. PATENT DOCUMENTS 2,418,856 A    4/1947  Stacey
3,339,240 A    9/1967  Corbett
(Continued)

FOREIGN PATENT DOCUMENTS

EP    354255    *   2/1990
WO    9919217 A1    4/1999
(Continued)

OTHER PUBLICATIONS

U.S. Appl. No. 13/593,489, filed Aug. 23, 2012.
(Continued)

*Primary Examiner* — Jill Heitbrink
(74) *Attorney, Agent, or Firm* — Medler Ferro Woodhouse & Mills PLLC

(57) ABSTRACT

Disclosed herein are methods and systems for the preparation of a co-injection molded multilayer plastic article. Some methods include co-extruding a combined polymeric stream having an interior core stream encased by an inner stream and an outer stream. One or more pulses in a thickness of the interior core stream create portions of an edge of the outer flow stream flowing along different streamlines. A first portion of an outer edge of the interior core stream flows beyond a second portion of the outer edge thereby forming one or more cohesion members that physically interlock the interior layer with the inner layer, with the outer layer or with both. Some embodiments reduce or eliminate a need for addition of an adhesive in the composite stream to prevent delamination of layers of the resulting multilayer plastic article. In some embodiments, cohesion members may be employed to produce a desired cosmetic effect in a resulting article.

15 Claims, 16 Drawing Sheets

(51) Int. Cl.
  *B32B 3/26* (2006.01)
  *B29C 45/77* (2006.01)
  *B29C 37/00* (2006.01)
  *B29L 31/00* (2006.01)
  *B29L 31/56* (2006.01)
  *B29K 105/00* (2006.01)

(52) U.S. Cl.
  CPC .............. *B29C 45/77* (2013.01); *B32B 3/263* (2013.01); *B29C 45/1646* (2013.01); *B29C 45/1657* (2013.01); *B29C 2045/1614* (2013.01); *B29C 2045/1648* (2013.01); *B29C 2945/76545* (2013.01); *B29C 2945/76595* (2013.01); *B29C 2945/76765* (2013.01); *B29C 2945/76859* (2013.01); *B29C 2945/76862* (2013.01); *B29K 2105/253* (2013.01); *B29K 2823/086* (2013.01); *B29K 2995/0098* (2013.01); *B29L 2031/56* (2013.01); *B29L 2031/712* (2013.01); *Y10T 428/1352* (2015.01); *Y10T 428/24612* (2015.01)

(56) References Cited

U.S. PATENT DOCUMENTS

| | | |
|---|---|---|
| 3,679,119 A | 7/1972 | Copping |
| 3,894,823 A | 7/1975 | Hanning |
| 3,944,124 A | 3/1976 | Hexel |
| 4,174,413 A | 11/1979 | Yasuike et al. |
| 4,554,190 A | 11/1985 | McHenry et al. |
| 4,568,261 A | 2/1986 | McHenry et al. |
| 4,751,035 A | 6/1988 | McHenry et al. |
| 4,946,365 A | 8/1990 | Kudert et al. |
| 4,990,301 A | 2/1991 | Krishnakumar et al. |
| 5,433,910 A | 7/1995 | Mukai et al. |
| 5,914,138 A | 6/1999 | Swenson |
| 6,180,042 B1 | 1/2001 | Takeuchi et al. |
| 6,596,213 B2 | 7/2003 | Swenson |
| 6,787,097 B1 | 9/2004 | Homann et al. |
| 6,908,581 B2 | 6/2005 | Sabin et al. |
| 7,306,446 B2 | 12/2007 | Sabin et al. |
| 7,517,480 B2 | 4/2009 | Sabin et al. |
| 8,491,290 B2 | 7/2013 | Swenson |
| 8,801,991 B2 | 8/2014 | Swenson |
| 2002/0192404 A1 | 12/2002 | Swenson |
| 2003/0124209 A1 | 7/2003 | Swenson |
| 2004/0022975 A1* | 2/2004 | Yokomizo ........... B29C 45/1646 428/35.7 |
| 2004/0265422 A1 | 12/2004 | Sabin et al. |
| 2006/0029823 A1 | 2/2006 | Brown |
| 2009/0152280 A1 | 6/2009 | Luburic |
| 2009/0285929 A1 | 11/2009 | Diamantakos et al. |
| 2010/0044916 A1 | 2/2010 | Richards et al. |
| 2011/0217496 A1 | 9/2011 | Swenson |
| 2012/0015122 A1 | 1/2012 | Swenson |
| 2012/0135171 A1 | 5/2012 | Swenson |
| 2013/0108834 A1 | 5/2013 | Sweetland |
| 2014/0272283 A1 | 9/2014 | Swenson |

FOREIGN PATENT DOCUMENTS

| | | |
|---|---|---|
| WO | 02081172 A1 | 10/2002 |
| WO | 2013028933 A1 | 2/2013 |

OTHER PUBLICATIONS

International Search Report and Written Opinion on Application PCT/US2012/052170, dated Dec. 4, 2012.

International Preliminary Report on Patentability on Application PCT/US2012/052170, dated Mar. 6, 2014.

International Search Report and Written Opinion by International Searching Authority for International Application No. PCT/US2014/026814 dated Jul. 28, 2014 (11 pages).

Eigl, F.A. et al., "Mehr Verstandnis für den Kern," 88:1 Kunststoffe 46-50 (Carl Hanser Verlag, Munich) (Jan. 1, 1998) (German), translated as F.A. Eigl et al., "A Better Understanding of the Core," 88:1 Kunststoffe 14-16 (Jan. 1, 1998).

Goodship, Vanessa: "Interfacial instabilities: implications for multi-material moulding", University of Warwick-Publications service & WRAP, May 5, 2010, XP002726724, http://wrap.warwick.ac.uk/3064/1/WRAP_THESIS_Goodship_2001.pdf [retrieved on Jul. 7, 2014). p. 12-25, 102-107, 122-147. (48 pages).

* cited by examiner

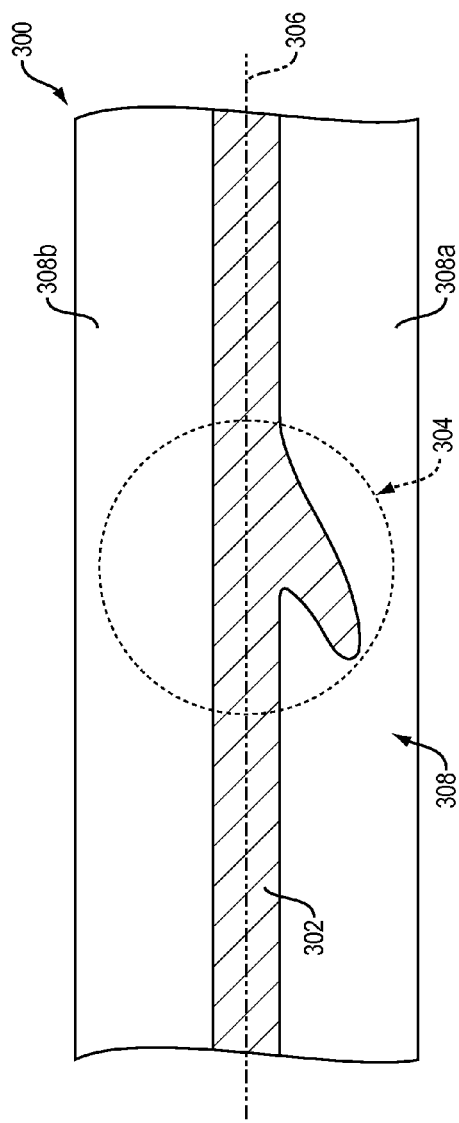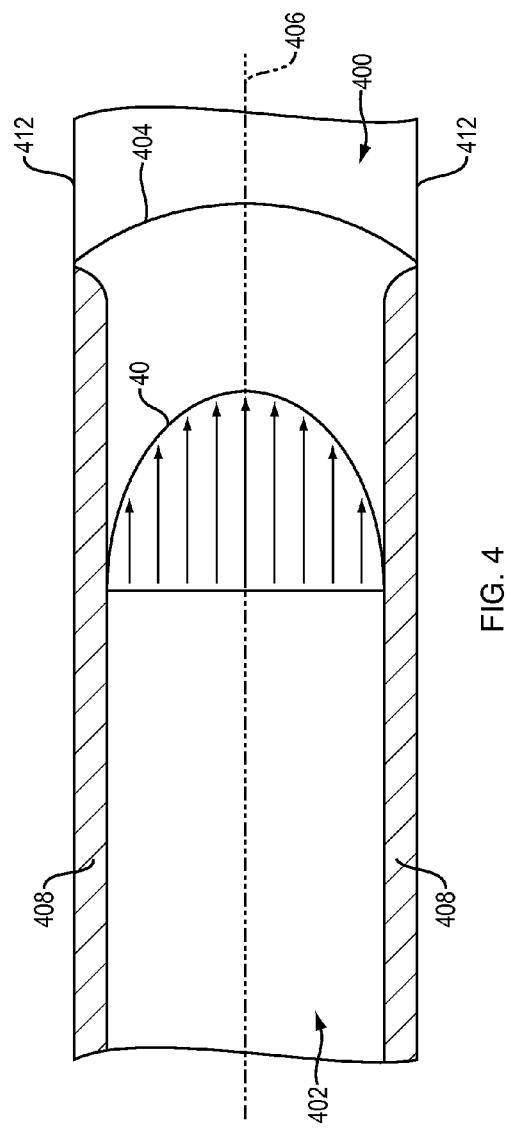

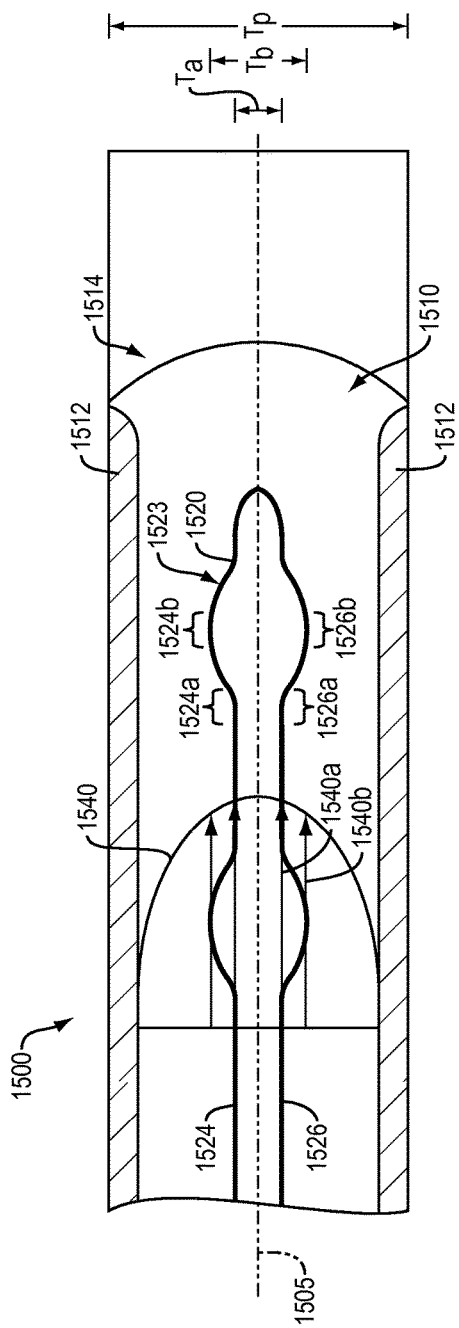
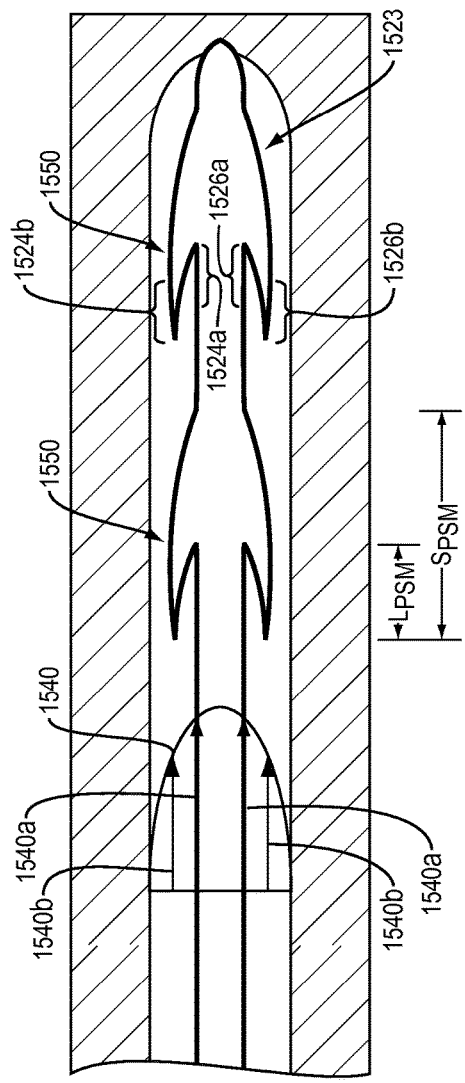
FIG. 23
FIG. 24

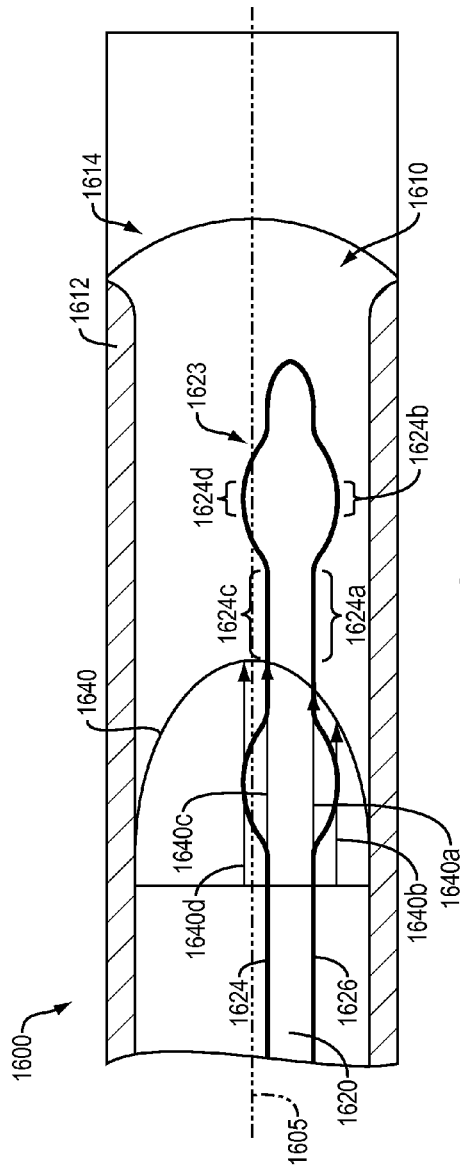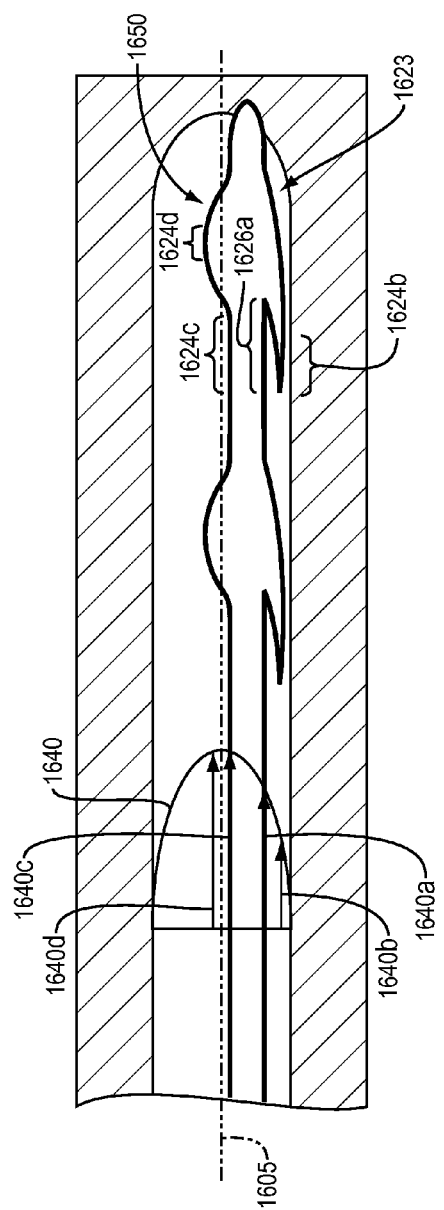

METHODS AND SYSTEMS FOR THE PREPARATION OF MOLDED PLASTIC ARTICLES HAVING A STRUCTURAL BARRIER LAYER

RELATED APPLICATION

The present application claims benefit under 35 U.S.C. §119(e) of U.S. Provisional Patent Application No. 61/798,376, filed Mar. 15, 2013, which is incorporated by reference herein in its entirety.

TECHNICAL FIELD

Many plastic articles, such as caps, lids and other closures, cups, preforms, and various other containers, are formed from injection molding processes. In some instances, the molding process is a co-injection process in which an annular combined stream of polymeric materials is forced along one or more pathways of an injection apparatus and into a mold cavity that forms the article to a desired configuration. The combined stream includes an annular interior core stream sandwiched between an annular inner stream and an annular outer stream. The interior core stream is a first polymeric material and the inner and outer streams are of at least one other polymeric material. In the resulting molded plastic article, the interior core stream material forms an interior core layer while the inner and outer stream materials form an inner skin layer and an outer skin layer, respectively, which encase the interior core layer.

Illustrative embodiments relate to systems and methods to facilitate cohesion of the interior core layer with the inner and outer layers that form the skin of the resulting plastic article with a reduced requirement for an adhesive to bond the inner, interior and outer layers together.

BACKGROUND

In forming polymeric plastic articles by injection or co-injection molding processes, it is often desirable to produce a plastic article having an interior core layer of a first polymeric material and a skin of at least one other polymeric material. The interior core layer is formed from an interior core stream of the first polymeric material. The skin, which has an inner layer and an outer layer, is formed from an inner and an outer stream of at least one other polymeric material. The same polymeric material(s) may be used for both the inner stream/inner layer and the outer stream/outer layer, or different polymeric materials may be used for the inner stream/inner layer than for the outer stream/outer layer.

The interior core stream is combined with the inner and outer streams to form an annular combined polymeric stream. Various methods of combining the polymeric streams may be employed. For example, the combined polymeric stream may be formed by sandwiching an annular interior core stream with an annular inner stream and an annular outer stream in an apparatus used to inject the combined stream into a mold cavity. The combined stream is then forced along the annular pathways of the mold cavity to form a molded plastic article having desired dimensions (i.e., configuration, thickness, etc.).

The interior core stream material is often selected such that the interior core stream forms an interior core layer in the resulting plastic article that functions, in some instances, as a barrier layer or as a scavenger layer. The barrier layer prevents foreign substances from invading the environment enclosed by the plastic article and/or prevents substances within the plastic article from escaping to the outside environment. One example of a scavenger layer is an oxygen scavenger layer.

In some situations, the barrier material and the skin materials do not adhere to each other without adding an adhesive material to the skin material, to the barrier material, or to both. Accordingly, in order to improve the adhesion of the interior core layer and the skin layers, adhesives are generally added before or during the molding process. For example, in some instances, an adhesive is added to the polymeric material that forms the skin, to the polymeric material that forms the interior layer, or to both.

SUMMARY

Some illustrative embodiments provide methods and systems for preparing molded plastic articles that achieve adhesion between an interior core layer and skin layers of the molded plastic article with a reduced amount of adhesive or with no adhesive.

Some embodiments include methods and systems that use one or more intentionally created pulsations in a thickness of an interior core stream during co-injection molding to form one or more cohesion members in a resulting article. The one or more cohesion members physically interlock an interior layer formed from the interior core stream with an inner layer of the resulting molded plastic article, with an outer layer of the resulting molded plastic article formed from the outer stream, or with both.

Some embodiments include methods and systems that control the volumetric flow of the inner and outer polymeric streams that form the inner and outer layers of the skin, respectively, such that a resulting plastic article has an interior core layer whose configuration interlocks with the skin inner layer, with the skin outer layer, or with both. In some embodiments, a plurality of polymeric plastic material streams is co-extruded to produce the resulting molded plastic article.

Some embodiments provide a method of co-extruding a plurality of plastic material streams to produce a resulting molded multi-layer plastic article including one or more cohesion members that structurally interlock an interior core layer with an inner skin layer, with an outer skin layer, or with both layers in the resulting plastic article. An example method includes forming an combined polymeric plastic stream in an injection nozzle, where the combined stream includes an annular interior core stream of a first polymeric material encased by an inner stream of a second polymeric material and an annular outer stream of the second polymeric material. The method also includes injecting the combined stream along the pathways into a mold cavity. The method further includes adjusting a the volumetric flow ratio of the inner stream to the outer stream during injection of the combined stream into a mold cavity to intentionally form the cohesion member from the interior core stream.

In some embodiments, adjusting the volumetric ratio of the inner stream to the outer stream includes adjusting a valve pin at a time $T_1$ to shift the interior core stream from flowing along a first streamline with a volumetric flow ratio between about 5:95 and about 95:5 across a streamline at a zero-gradient of a velocity profile of a flow front of the combined polymeric plastic stream (the zero-gradient of velocity streamline) to flowing along a second streamline.

In some embodiments, adjusting the volumetric ratio of the inner stream to the outer stream includes adjusting a valve pin at a time $T_1$ to shift the interior core stream from flowing along a first streamline with a volumetric flow ratio between about 5:95 and about 95:5 to flowing along a second streamline that has a velocity greater than the first streamline without crossing the zero-gradient velocity streamline. In some embodiments, the second streamline may be the zero-gradient velocity streamline.

In some embodiments, after shifting the interior core stream from a first streamline to a second streamline at time $T_1$, the method further includes adjusting the valve pin at a later time $T_2$ to shift the interior core stream from flowing along the second streamline to flowing along a third streamline. In some embodiments, the time interview between time $T_1$ and time $T_2$ is between about 5 milliseconds and about 50 milliseconds. In some embodiments, the third streamline is across the zero-gradient velocity streamline from the second streamline and the second streamline is away from the zero-gradient velocity streamline. The velocity along the third streamline may be less than the velocity along the second streamline. In some embodiments, the third streamline is the same as the first streamline.

In some embodiments, a magnitude of a length (L) of the cohesion member is the same as or less than a magnitude of a local thickness (T) of the resulting article at the cohesion member, which may result in a greater cohesive force between the cohesive member and one or both of the skin layers than if the magnitude of the length of the cohesion member were greater than the magnitude of the local thickness.

In some embodiments, the first polymeric material comprises ethyl vinyl alcohol (EVOH) and the second polymeric material comprises polypropylene.

In some embodiments, the viscosity of the interior core stream falls in the range of 40-400 Pa-sec.

In some embodiments, a cosmetic effect is formed in the resulting molded plastic article by the shifting of the interior core stream. In some embodiments a color of the interior core stream is visually distinguishable in the resulting molded plastic article.

In some embodiments, the first polymeric material and the second polymeric material are substantially free of adhesive. In some embodiments, the resulting interior, inner and outer layers are free of, or substantially free of, adhesive, or include a smaller amount of adhesive, or a lower proportion of adhesive, than would be required in the absence of the cohesion member.

In some embodiments, the cohesion member is formed during a filling phase of a molding cycle. In some embodiments, the cohesion member is formed during a packing phase of a molding cycle. In some embodiments the cohesion member is formed during both a filling phase and a packing phase of a molding cycle.

Some embodiments provide a co-injection molded multi-layer plastic article having one or more cohesion members that structurally interlock an interior layer of the article to the inner layer of the article, to the outer layer, or to both. An example co-injection molded multi-layer plastic article has an inner layer including a first polymeric material and an outer layer including the first polymeric material. The article also has an interior core layer including a second polymeric material. The interior core layer is disposed between the inner layer and the outer layer and intentionally configured to form a cohesion member structurally interlocking the interior core layer to the inner layer, to the outer layer, or to both.

In some embodiments, a magnitude of a length (L) of the cohesion member is the same as or less than a magnitude of a local thickness (T) of the multi-layer plastic article at the cohesion member. In some embodiments cohesion member is formed of a first segment of the interior core layer overlapping a second segment of the interior core layer within a thickness of the article. In some embodiments, the cohesion member is formed of a segment of the interior core layer protruding into the inner layer, into the outer layer, or protruding into both.

In some embodiments, none of the interior core layer, the inner layer and the outer layer includes a compounded adhesive.

The molded plastic article may be for use as a closure, or suitable for use as a container, or suitable for another use.

Some embodiments provide a system for forming a multi-layer molded plastic article having a cohesion member. For example, in some embodiments, the system includes a mold having a plurality of cavities to mold a plurality of multi-layered plastic articles, a first material source to supply a first polymeric material for use in forming at least one layer of each of the plurality of multi-layered plastic articles, and a second material source to supply a second polymeric material for use in forming at least one layer of each of the plurality of multi-layered plastic articles. The system also includes a plurality of nozzles in communication with a portion of the mold to inject the first and second polymeric materials into each of the plurality of cavities. Each nozzle is configured to form a composite stream including an inner stream including a first material, an annular outer stream including the first material, and an annular interior core stream including a second material, with the interior core stream the inner stream and the outer stream. Each nozzle is further configured for adjustment of a volumetric ratio of the of the inner stream to the outer stream in the composite stream flow ejected from the nozzle. The system also includes a first set of flow channels configured to distribute the first polymeric material from the first material source to each of the plurality of nozzles and a second set of flow channels configured to distribute the second polymeric material from the second material source to each of the plurality of nozzles. The system further includes a processor programmed to adjust a volumetric ratio of the inner stream to the outer stream in the composite stream flow ejected from the nozzle during ejection of the composite streams from the nozzles into the plurality of cavities, forming a cohesion member in each cavity from the interior core stream that structurally interlocks an interior layer of the resulting molded plastic article formed from the interior core stream with an inner layer of the resulting molded plastic article formed from the inner stream, with an outer layer of the resulting molded plastic article formed from the outer stream, or with both.

In some embodiments, the processor is further programmed to control a position of a valve pin in each of the plurality of nozzles to control the volumetric ratio of the inner flow stream to the outer flow stream. In some embodiments, the cohesion member is formed during a filling phase of a molding cycle, during a packing phase of the molding cycle or during both. In some embodiments, the inner layer, the outer layer and the interior core layer of the resulting articles produced by the system are substantially free of a compounded adhesive.

Some embodiments provide a computer-readable medium storing computer executable instructions implementing any methods described herein.

In some embodiments, the interior core stream is controlled alternatively with the inner and outer streams, or controlled in combination with controlling the inner and outer streams, to produce the interlocked configuration (i.e.

cohesion member) and resulting cohesion of the interior core layer with the inner and outer skin layers without an adhesive, or with a reduced or lowered amount of adhesive. In some embodiments, the step of controlling the interior core stream includes adjusting the volumetric flow ratio of the inner to outer streams by adjusting a valve pin in the nozzle so as to place the interior core stream at a first streamline wherein the volumetric flow ratio is between about 5:95 and about 95:5. At time $T_1$, the valve pin is adjusted to shift the interior core stream to a second streamline with a velocity less than the velocity of the first streamline. At time $T_2$, the valve pin is adjusted to intentionally shift the interior core stream back to the first streamline or to a third streamline to form the cohesion member.

In certain embodiments, the step of controlling the interior core stream includes adjusting the volumetric flow ratio of the inner to outer streams by adjusting a valve pin in the nozzle so as to place the interior core stream at a first streamline at a time $T_0$ such that the volumetric flow ratio of inner stream to outer stream is between about 5:95 and about 95:5 or is between about 20:80 and about 80:20. The steps further include adjusting the valve pin so as to shift the interior core stream to a second streamline across the zero-gradient of the velocity profile of the composite stream (hereafter the "zero-gradient velocity streamline" or the "fastest streamline") from the first streamline at a time $T_1$, and adjusting the valve pin so as to shift the interior core stream to a third streamline across the zero-gradient velocity streamline at a time $T_2$, to form a cohesion member with a double dog-leg configuration. In some embodiments, at time $T_0$ and $T_2$ the volumetric flow ratio is selected from a range of between about 20:80 to about 80:20, and at time $T_1$ the volumetric flow ratio is selected from a range of between about 80:20 to about 20:80. In other embodiments, at time $T_0$ and $T_2$ the volumetric flow ratio is selected from the group consisting of 5:95, 95:5, 60:40, 75:25 and 80:20, and at time $T_1$ the volumetric flow ratio is selected from the group consisting of 20:80, 25:75 and 40:60.

In certain other embodiments, the step of controlling the interior core stream includes adjusting the volumetric flow ratio of the inner to outer streams by adjusting a valve pin in the nozzle so as to place the interior core stream at a first streamline at a time $T_0$ wherein the volumetric flow ratio is between about 5:95 and about 95:5, and adjusting the valve pin so as to shift the interior core stream to a second streamline at a time $T_1$ without crossing the zero-gradient velocity streamline, and adjusting the valve pin so as to shift the interior core stream to a third streamline between the first and second streamline, such that a cohesion member is formed. In some embodiments, the cohesion member has a double dog-leg configuration. In some embodiments, at time $T_0$ the volumetric flow ratio is between about 20:80 and about 40:60, and at time $T_1$ the volumetric flow ratio is between about 50:50 and the volumetric flow ratio at time $T_0$. At time $T_2$ the volumetric flow ratio is between about 20:80 the volumetric flow ratio at time $T_1$. In other embodiments, at time $T_0$ the volumetric flow ratio is between 80:20 and about 60:40, and at time $T_1$ the volumetric flow ratio is between about 50:50 and the volumetric flow ratio at time $T_0$, and at time $T_2$ the volumetric flow ratio is between about 80:20 and the volumetric flow ratio at time $T_1$.

In certain other embodiments, the step of controlling the interior core stream includes adjusting the volumetric flow ratio of the inner to outer streams by adjusting a valve pin in the nozzle so as to place the interior core stream at a first streamline at a time $T_0$ wherein the volumetric flow ratio is between about 5:95 and about 95:5, and adjusting the valve pin so as to shift the interior core stream to a second streamline at a time $T_1$ across the zero-gradient velocity streamline, such that a cohesion member is formed. In some embodiments, the cohesion member has a single dog-leg configuration. In some embodiments, at time $T_0$ the volumetric flow ratio is between about 20:80 and about 50:50, and at time $T_1$ the volumetric flow ratio is between about 50:50 and about 80:20. In other embodiments, at time $T_0$ the volumetric flow ratio is between about 80:20 and about 50:50, and at time $T_1$ the volumetric flow ratio is between about 50:50 and about 20:80.

In certain other embodiments, the step of controlling the interior core stream includes adjusting the volumetric flow ratio of the inner to outer streams by adjusting a valve pin in the nozzle. The adjusted valve pin places the interior core stream at a first streamline at a time $T_0$ such that the volumetric flow ratio is between about 5:95 and about 95:5. The valve pin is then adjusted so as to shift the interior core stream to a second streamline at a time $T_1$ without crossing the zero-gradient velocity streamline. The resulting cohesion member has a single dog-leg configuration. In some embodiments, at time $T_0$ the volumetric flow ratio is between about 5:95 and about 50:50, and at time $T_1$ the volumetric flow ratio is between about 50:50 and the volumetric flow ratio selected at time $T_0$. In other embodiments, at time $T_0$ the volumetric flow ratio is between about 50:50 and about 95:5, and at time $T_1$ the volumetric flow ratio is between about 50:50 and the volumetric flow ratio selected at time $T_0$.

In certain other embodiments, the step of controlling the interior core stream includes adjusting the volumetric flow ratio of the inner to outer streams by adjusting a valve pin in the nozzle so as to place the interior core stream at a first streamline at a time $T_0$ wherein the volumetric flow ratio is about 50:50, and adjusting the valve pin so as to shift the interior core stream to a second streamline at a time $T_1$ wherein the volumetric flow ratio is either between about 5:95 and about 50:50 or between about 50:50 and about 95:5, and adjusting the valve pin so as to shift the interior core stream to a third streamline at a time $T_2$ wherein the volumetric flow ratio is between about 50:50 and the volumetric flow ratio at selected at time $T_1$, such that a cohesion member is formed having a single protrusion dog-leg configuration. In some embodiments, the volumetric flow ratio at time $T_1$ is between about 5:95 and about 50:50, and the volumetric flow ratio at time $T_2$ is between about 50:50 and the volumetric flow ratio selected at time $T_1$. In other embodiments, the volumetric flow ratio at time $T_1$ is between about 50:50 and about 95:5, and the volumetric flow ratio at time $T_2$ is between about 50:50 and the volumetric flow ratio selected at time $T_1$.

In some embodiments, the time between $T_0$ and $T_1$ is between about 5 and 50 milliseconds. In some embodiments, the viscosity of the interior core stream is between 40 and 4000 Pa-sec. In some embodiments, the flow thickness of the interior core stream is between about 10 microns and about 50 microns.

In some embodiments, a cosmetic effect is formed by the interlocking of the interior core layer and the skin. In some embodiments, the color of the interior core stream is visually distinguishable from the inner and outer streams.

In some embodiments, the interior core stream and interior core layer are formed from ethyl vinyl alcohol (EVOH). Other suitable materials that may be used as the interior core layer include, but are not limited to nylon, polyethylene naphthalate (PEN), and cyclic olefin copolymers (COCs). In some embodiments, the skin layers (i.e., the inner and outer layers) are formed from polymeric plastic materials such as polyethylene terephthalate (PET), high-density polyethylene (HDPE), polypropylene (PP), and polycarbonate (PC).

In certain embodiments, a molded plastic article includes an inner layer, an outer layer, and an interior core layer encased by the inner and outer layer, where the interior layer includes a cohesion member configured to secure the interior layer to the inner or to the outer layer. In some embodiments, the inner layer, the outer layer and the interior core layer are free of compounded adhesive. In some embodiments, one or more of the inner layer, the outer layer and the interior core layer have a reduced amount of adhesive relative to a molded plastic article without a cohesion member. The configuration of the cohesion member prevents the interior core layer from delaminating from the skin without the need for adhesives, or with a reduced need for adhesive.

In some embodiments, the molded plastic article is an article suitable for use as a closure mechanism or as a device for covering an open end of a container. In other embodiments, the plastic article is an article suitable for use as a container.

Certain embodiments provide a system for forming a molded plastic article having a cohesion member. In some embodiments, the system comprises a mold having a plurality of cavities to mold a plurality of multi-layered plastic articles. The system includes a first material source to supply a first polymeric material for use in forming at least one layer of each of the plurality of multi-layered plastic articles; a second material source to supply a second polymeric material for use in forming at least one other layer of each of the plurality of multi-layered plastic articles; a plurality of nozzles in communication with a portion of the mold to inject the first and second polymeric materials into each of the plurality of cavities; a first set of flow channels configured to distribute the first polymeric material from the first material source to each of the plurality of nozzles; a second set of flow channels configured to distribute the second polymeric material from the second material source to each of the plurality of nozzles; and a processor programmed to control a volumetric ratio of an inner flow stream to an outer flow stream formed from the first polymeric material in one of the nozzles to selectively change a flow stream of the first polymeric material to form a cohesion member to secure an interior layer to an inner layer or to an outer layer of the resulting multi-layered plastic article. The cohesion member is a structural element that secures the interior layer to the inner layer or the outer layer of the resulting multi-layered plastic article without adhesive or with a reduced need for adhesive. In some embodiments, the first and/or second polymeric materials are free of a compounded adhesive. In some embodiments, the processor is programmed to control a position of a valve pin in each of the plurality of nozzles to control the volumetric ratio of the inner stream to the outer stream.

In some embodiments, a computer readable medium, storing computer executable instructions for performing a method of co-extruding a plurality of polymeric plastic material streams to form a resulting molded plastic article having a cohesion member, is provided. The medium stores instructions for: forming a combined polymeric stream comprising an inner flow stream and an outer flow stream of a first polymeric material and an interior flow stream of a second polymeric material, and controlling the volumetric flow ratio of the inner flow stream to the outer flow stream to intentionally form a cohesion member from the interior core stream. The cohesion member interlocks an interior layer of the resulting molded plastic article with one or both of an inner layer and an outer layer of the resulting molded plastic article. Further, in some embodiments, the first and second polymeric plastic materials are substantially free of adhesive.

BRIEF DESCRIPTION OF THE DRAWINGS

FIG. 3 is a cross-sectional view of a portion of a wall of an exemplary plastic article that includes a cohesion member made by the process described herein.

FIG. 4 is a cross-sectional view of the velocity profile of a polymeric stream as it flows along a pathway of a mold cavity, in accordance with some embodiments.

FIG. 23 is a schematic cross-sectional view of a portion of a composite stream flowing along a mold pathway and centered on a fast flow streamline, in accordance with an embodiment.

FIG. 24 is a schematic cross-sectional view of a portion of the composite stream flowing along a mold pathway and centered on the fast flow streamline at a later time than that depicted in FIG. 23.

FIG. 25 is a schematic cross-sectional view of a portion of a composite stream flowing along a mold pathway and offset from a fast flow streamline, in accordance with an embodiment, in accordance with an embodiment.

FIG. 26 is a schematic cross-sectional view of a portion of the composite stream flowing along a mold pathway and offset from the fast flow streamline at a later time than that depicted in FIG. 25.

Figure 1:
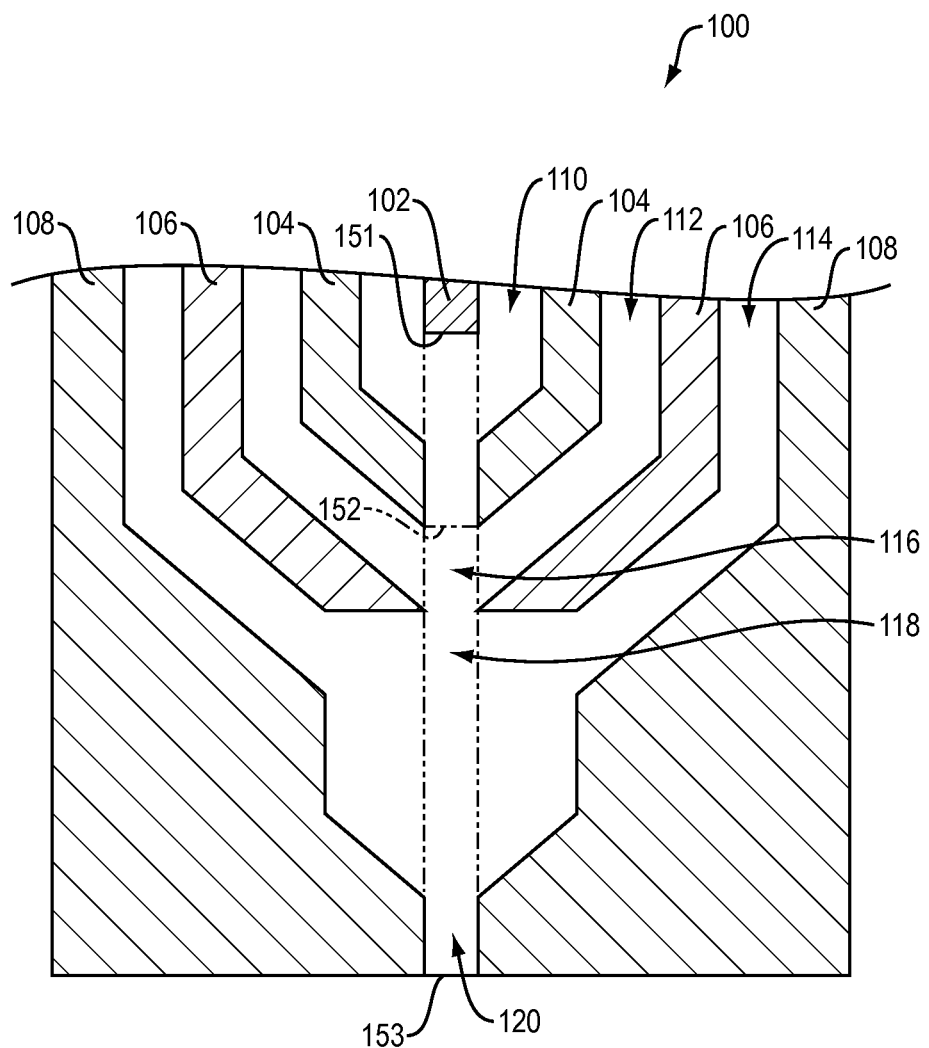
FIG. 1 is a cross-sectional view of an exemplary nozzle assembly suitable for use in the methods and systems described herein.

As will be appreciated by one of skill in the art, the drawings are schematic, are not drawn to scale and do not accurately indicate relative dimensions. Throughout the drawings, dimensions (e.g. layer thicknesses) are exaggerated for illustrative purposes.

DETAILED DESCRIPTION

I. Definitions

In accordance with the present disclosure and as used herein, the following terms are defined with the following meanings, unless explicitly stated otherwise.

As used herein, the term "volumetric flow ratio" refers to the ratio of the volume of the inner polymeric stream flowing per unit time to the volume of the outer polymeric stream flowing per unit time in a combined polymeric flow stream. For example, a 20:80 volumetric flow ratio refers to the combined flow of the inner and outer streams in which 20% of the combined flow (volume per unit time) is the inner polymeric stream and 80% of the combined flow (volume per unit time) is the outer polymeric stream. At a 50:50 volumetric flow ratio, the inner and outer polymeric streams have equal volumes flowing per unit time, with each forming 50% of the combined stream.

As used herein, the terms "zero-gradient of velocity streamline," "zero-gradient velocity streamline," "zero-velocity," and "zero-velocity streamline" are used interchangeably to refer the fastest streamline of the combined polymeric stream flow front, which occurs at the zero gradient of the velocity profile for the composite flow. Generally speaking, the fastest streamline, which is the streamline at the zero gradient of the velocity profile, corresponds to about a 50:50 volumetric flow ratio of the inner polymeric stream to the outer polymeric stream. Thus, the term "50:50 streamline" may also be used to refer to the fastest streamline of the combined polymeric stream flow front.

As used herein, the term "dog-leg" refers to a configuration of some of the structural cohesion members. The dog-leg configuration includes a continuous layer of polymeric material. The dog-leg configuration is formed from an interior core stream that flows along multiple streamlines of a combined polymeric stream such that in a cross-sectional view of the combined polymeric stream, the interior core stream overlaps on itself as depicted, for example, FIG. 10.

As used herein, the term "adhesion," or "adhesive" refers to any means by which two or more structural parts of a composite structure are joined to prevent delamination. Adhesion includes at least one of structural cohesion and chemical bonding of the structural parts to each other. As used herein, the term "bond" or "bonding" refers to adhesion of two or more structural parts of a composite structure, wherein the adhesion is due primarily to the chemical bonding of the structural parts.

As used herein, the term "cohesion," or "cohesive" refers primarily to the adhesion of two or more structural parts of a composite structure, wherein the adhesive effect is due to the structural interlocking of the structural parts. As used herein, the term "cohesion member" is a structural element. It refers to an overlapping interior core layer or to a protrusion extending from an interior core layer of a molded plastic article that causes the interior core layer to interlock with a skin of the molded plastic article reducing or eliminating the need for, or use of, adhesives.

As used herein, the phrases eliminating or reducing the need to incorporate adhesives, and similar phrases, refer to systems and methods employing no adhesive or employing less adhesive that would be required if no "cohesion member" were formed.

II. Description

Exemplary embodiments provide methods and systems for the manufacture of molded plastic articles. The molded plastic articles include an interior core layer that is encased by a skin, which includes an outer skin layer an inner skin layer. The molded plastic articles are formed by injecting a combined polymeric stream into a mold cavity and forcing the combined polymeric stream along pathways of the mold cavity. The combined polymeric stream includes an annular interior core polymeric stream that is sandwiched between an annular inner polymeric stream and an annular outer polymeric stream. The interior core layer is formed from the annular interior core polymeric stream. The inner and outer skin layers are formed from the annular inner polymeric stream and the annular outer polymeric stream, respectively. As the combined polymeric stream is formed, the volumetric flow ratio of the inner polymeric stream to the outer polymeric stream is adjusted at selected and desired time points, such that the interior core stream is shifted from flowing along a first streamline to flowing along another streamline for a desired time interval. The number of shifts and the time interval between shifts determine the placement and the structure of the cohesion member(s) formed in the resulting article. For example, multiple shifts in position of the interior core stream performed at relatively shorter time intervals increase the number of cohesion members formed in the resulting article. As another example, multiple shifts in position of the interior core stream performed at relatively longer time intervals decrease the number of cohesion members formed in the resulting article. The flow ratios of the inner stream, the outer stream and the interior stream are adjusted to create the desired cohesion member structure(s) at the desired location(s) in each molded article.

The shifts in streamline of the interior core stream form one or more structural elements in the form of one or more cohesion member(s) that secure the interior core layer to the skin layers, thereby increasing the adhesion of the interior core layer and the skin, which reduces or eliminates the need for incorporating adhesives into the process of preparing the molded plastic article. Examples of resulting plastic articles include, but are not limited to, cups, preforms, closures, bottles, and vials. Cohesion of the interior core layer to the skin is important to prevent delamination. The cohesion member(s) secure the interior core layer to the skin thereby increasing the adhesion of the interior core layer and the skin layers, preventing delamination, and reducing or eliminating the need for incorporating adhesives into the process of preparing the molded plastic article.

Taught herein are methods and systems that reduce or eliminate the need for including an adhesive in the co-extrusion molding process, for example, the need to compound an adhesive into a polymeric material used in the molding process. Embodiments taught herein improve the cohesion of the interior core layer to the skin by shifting the streamline of the interior core stream within the composite stream such that the interior core stream forms an interior core layer that has at least one cohesion member.

Articles in which, an interior core layer is formed from a first polymeric material and the one or more of the skin layers are formed from a different polymeric material are subject to failure by delamination of different layers formed from different materials. In such articles, the structural element formed by the interior core layer is important in prevent delamination of the layers when no adhesive or a reduced amount of adhesive is present in the polymeric materials.

Materials suitable for use with embodiments of the invention include, but are not limited to, polymer-based materials such as, polyethylene terephthalate (PET), ethylene vinyl alcohol (EVOH), MXD6 nylon, polypropylene (PP), and polycarbonates (PC). In some embodiments, the inner and outer streams are the same or different polymeric materials. For example, in some embodiments, the inner and outer streams which form inner and outer layers are PET, while an interior stream used to form an interior layer is a material chosen to enhance the overall performance of the resulting article, or to reduce the cost of the resulting article. For example, one or more interior streams for interior layers may include one or more of a barrier material (MXD6 Nylon or EVOH), an oxygen scavenging material, a recycled material, or other performance-enhancing or cost-reducing material. The type of material used for the interior layer/stream is often different from the type of material used for the inner and outer layers/streams.

In some embodiments, the interior core layer, functions as a barrier layer shielding the environment enclosed by the plastic article from intrusion by the environment outside the plastic article. The interior core further functions to prevent the diffusion of enclosed materials to the outside environment. The interior core may further function as a scavenger layer to remove or inactivate an impurity.

For example, some multi-layer plastic articles are commonly made from materials such as polyethylene (PET) and polypropylene (PP), which resist environmental degradation, and are reasonably durable, watertight, and economically produced, but are gas permeable (e.g., permeable to oxygen, nitrogen, etc.). For applications in which gas permeability is undesirable (e.g., containers for food products, medicines and products that degrade upon gaseous exposure) a plastic article with gas permeable skin layers (e.g., layers of PET or PP) may include an interior layer of a barrier material and/or a gas scavenger material, such as ethylene vinyl alcohol (EVOH), between skin layers of PET or PP.

The interior core layer may, for example, include one or more layers of a barrier material, oxygen scavenging material, recycled material, or other performance-enhancing or cost-reducing material. Suitable polymeric materials for use as the interior core layer or barrier layer include, but are not limited to, MXD6 nylon, EVOH, COC, and PEN. The material used for the interior core layers/streams is often, though not exclusively, different from the material used for the inner and outer layers/streams.

The inner and outer layers, which form the skin, may include polyethylene terephthalate (PET) or polypropylene. The various embodiments provide methods and systems whereby the non-adhesive cohesion between the interior core layer and the skin is improved such that the inner and outer layers, or in certain embodiments, the interior core layer, are free of or substantially free of adhesives. In some embodiments the combined polymeric stream is substantially free of adhesives. In other embodiments, the combined polymeric stream is completely free of adhesives.

FIG. 1 illustrates an exemplary nozzle assembly that is suitable for use with the exemplary methods and systems disclosed herein. Nozzle assembly 100 includes a movable valve pin 102, an inner first circular wall 104, a second circular wall 106 and an outer third circular wall 108. The inner first circular wall 104 defines an inner channel 110 that is suitable for accepting an inner polymeric stream. An interior channel 112 suitable for accepting an interior polymeric stream is defined by the inner first circular wall 104 and the second circular wall 106. An outer channel 114 suitable for accepting an outer polymeric stream is defined by the outer third circular wall 108 and the second circular wall 106.

The first inner channel 110 is coupled to the interior channel 112. The inner channel 110 includes an orifice through which an annular inner flow stream passes and combines with an interior flow stream from the interior channel 112. The annular inner flow stream and the interior flow stream combine in a first combination area 116. The interior channel 112 and the first combination area 116 are coupled to the outer channel 114 by an orifice. The first combination area 116 directs a combined annular flow of the interior flow stream and the inner flow stream into a second combination area 118. The second combination area 118 combines the annular outer flow stream with the combined annular flow stream of the interior flow and inner flow to form a combined annular flow stream having an outer flow stream, an interior flow stream and an inner flow stream. The nozzle 100 further includes an egress port 120 for ejecting the combined polymeric stream. A combined polymeric stream can be forced along the egress port 120 to a gate portion of a mold.

Movable valve pin 102 can be adjusted to move within and beyond the inner channel 110 to the first combination area 116, to the second combination area 118 and/or beyond the second combination area 118. The moveable valve pin 102 can be adjusted from a first fully open position (e.g., position 151) in the inner channel 110 to a second position (e.g., position 152), whereby the flow of any polymeric material from the inner channel 110 would be halted. Valve pin 102 may also be adjusted to a third fully closed position (e.g., position 153), such that the combined polymeric stream is halted. The moveable valve pin 102 can be placed in a variety desired positions between the fully open position and the fully closed position to control the volumetric flow of the inner polymeric stream from the inner channel 110 and the volumetric flow of the outer polymeric stream from the outer channel 114. Control over the volumetric flow of the inner polymeric stream and the volumetric flow of the outer polymeric stream in turn controls the position of the interior polymeric stream with respect to the average velocity of the flow front of the combined annular flow stream.

Upon egress from the nozzle assembly 110, the combined annular polymeric stream includes an annular interior core stream sandwiched by an annular inner polymeric stream and an annular outer polymeric stream. The combined stream flows along annular flow pathways within the mold cavity with the interior core stream sandwiched between the inner and outer polymeric streams.

Figure 2:
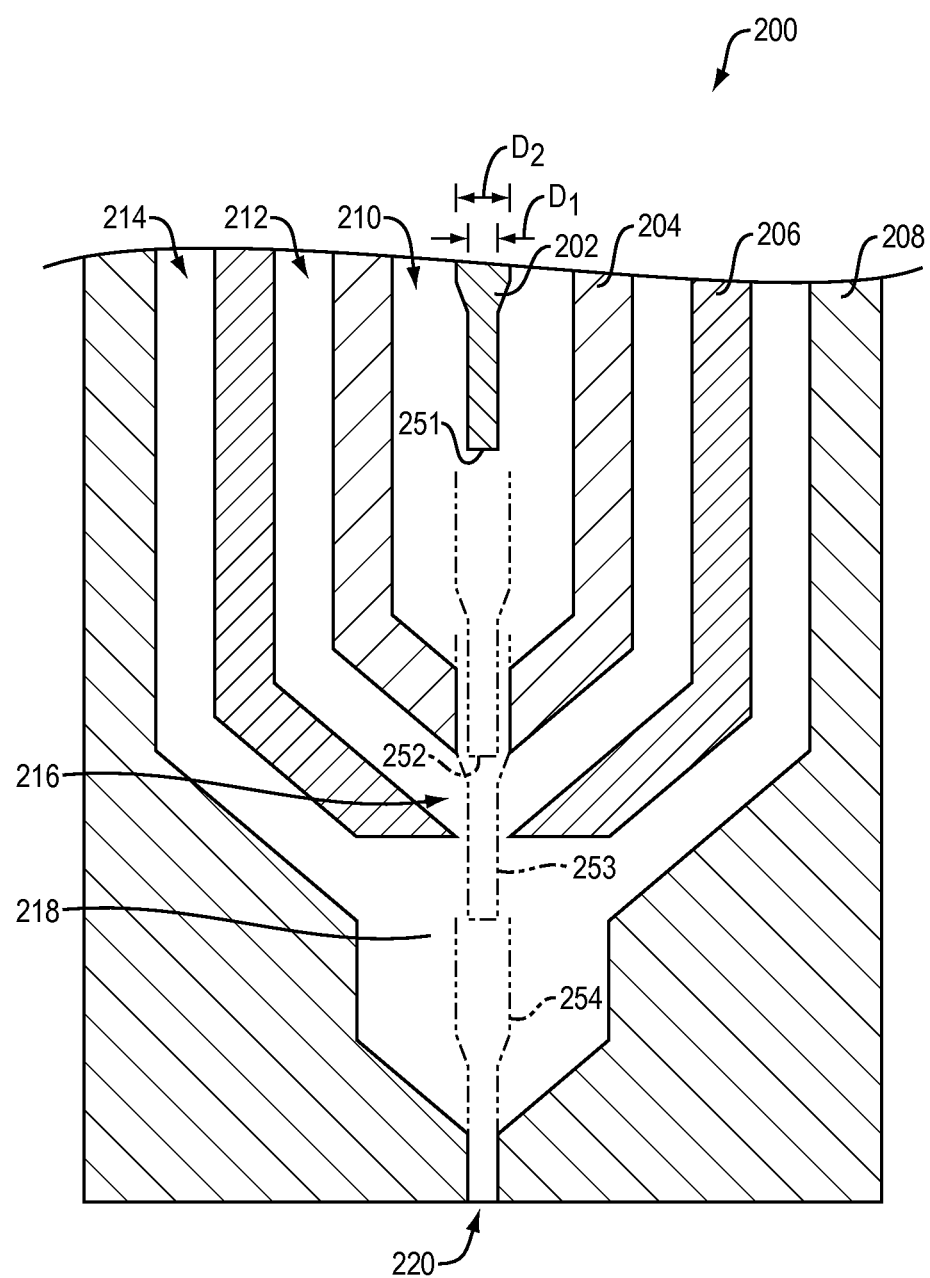
FIG. 2 is a cross-sectional view of another exemplary nozzle assembly, suitable for use in the methods and systems described herein.

FIG. 2 illustrates another exemplary nozzle assembly that is suitable for use with the exemplary methods and systems disclosed herein. Nozzle assembly 200 includes a movable tapered valve pin 202, an inner first circular wall 204, a second circular wall 206 and an outer third circular wall 208. The inner first circular wall 204 defines an inner channel 210 that is suitable for accepting an inner polymeric stream. An interior channel 212 suitable for accepting an interior polymeric stream is defined by the inner first circular wall 204 and the second circular wall 206. An outer channel 214 suitable for accepting an outer polymeric stream is defined by the outer third circular wall 208 and the second circular wall 206.

The inner channel 210 is coupled to the interior channel 212 by an orifice. The orifice directs a flow of the inner polymeric material from the inner channel into a first combination area 216. The first combination area 216 combines the annular inner stream of polymeric material from the inner channel 210 with the annular interior stream of polymeric material from the interior channel 212. The interior channel 212 and the first combination area 216 are coupled to the outer channel 214 by an orifice. The annular flow of the inner polymeric stream and the interior polymeric stream combine with the annular flow of the outer polymeric stream in a second combination area 218. The second combination area 218 forms a combined annular flow of the annular inner polymeric stream, the annular interior polymeric stream and the annular outer polymeric stream. The nozzle 200 further includes an egress port 220 for ejecting the combined polymeric stream. A combined polymeric stream can be forced along the egress port 220 to a gate portion of a mold.

The moveable tapered valve pin has a proximal portion having a first diameter $D_1$ and distal portion having a second larger diameter $D_2$. The movable tapered valve pin 202 can be moved and placed in a number of selected positions between position 251 and position 252, between position 252 and position 253, and between position 253 and position 254. The movement and positioning of the movable tapered valve pin 202 controls the volumetric flow of the inner polymeric stream from the inner channel 210 and the volumetric flow of the outer polymeric stream from the outer channel 214. Control over the volumetric flow of the inner polymeric stream and the volumetric flow of the outer polymeric stream in turn controls the position of the interior polymeric stream with respect to the average velocity of the flow front of the combined annular flow stream.

For example, the moveable tapered valve pin 202 can be adjusted from position 251 in the inner channel 210 to position 252, to at least partially restrict flow of material from the inner channel 210 into the combination area 216. Moveable tapered valve pin 202 may be adjusted to position 253, which would block flow from the inner channel 210 into the combination area 216 and would partially restrict flow from the interior channel 212 into the combination area 216. With the moveable tapered valve pin 202 adjusted to position 4 the egress port 220 is blocked no flow is ejected out of the nozzle. By adjusting the position of the moveable tapered valve pin 202, the volumetric flow ratio of the combined polymeric stream can also be adjusted to completely or partially restrict the flow from any of the channels inner channel 210, the interior channel 212 and the outer channel 214.

When the valve pin 220 is in position 251 or 252 upon exiting the nozzle assembly through egress port 220, the combined annular polymeric stream, which flow along annular flow pathways within the mold cavity, includes an annular interior core stream sandwiched by an annular inner polymeric stream and an annular outer polymeric stream. When the valve pin 220 is in position 253, the inner stream is blocked and the combined stream ejected from the nozzle includes the interior core stream and the outer polymeric stream.

FIG. 3 depicts a cross-sectional view of a portion of a wall 300 of an exemplary resulting plastic article formed in accordance with the teachings herein. The wall 300 includes an interior core layer 302, a skin 308, which includes an inner skin layer 308a and an outer skin layer 308b, and a cohesion member 304. In the resulting plastic article 300 the cohesion member 304 is formed as a protrusion of the interior core layer 302 into the skin 308 of the resulting plastic article.

In this embodiment, the cohesion member 304 is formed shifting a position of an interior core stream in the combined flow from a fast streamline, to a slower streamline, and back to a fast streamline during co-injection. For example, at time $T_0$, the interior core stream, which forms the interior core layer 302 of the resulting article, travels along a streamline at or near the zero-gradient of the velocity profile streamline (hereafter "the zero-gradient velocity streamline"), which for this example will be referred to as the fast streamline, depicted by center line 306. At time $T_1$, within the nozzle, the interior core stream is shifted in position to a slower streamline away from the zero-gradient velocity streamline, and then subsequently shifted back to a faster streamline at time $T_2$. In this example, the portion of the interior core stream ejected from the nozzle between times $T_0$ and $T_1$ will be referred to as the first interior core stream, the portion of the interior core stream ejected from the nozzle between times $T_1$ and $T_2$ will be referred to as the second interior core stream, and the portion of the interior core stream ejected from the nozzle after time $T_2$ be referred to as the third interior core stream portion.

As the combined stream flows from the nozzle, into and through the mold cavity, the second interior core stream portion traveling along the slower streamline that is displaced from the zero-gradient velocity streamline increasingly lags behind the first interior core stream portion traveling along the fast, zero-gradient velocity streamline. Further, the shift in position of the interior core layer from the slower streamline back to a faster streamline at time $T_2$ allows the third interior core stream portion traveling the along the faster streamline, to at least partially catch up with and overlap the second interior core stream portion traveling along the slower along the slower streamline. The overlapping second interior core stream portion and third interior core stream portion forms the single protrusion cohesion member 304 in the resulting article. The cohesion member 304 is a structural member that interlocks the interior core layer 302 with the inner skin layer 308a. In other embodiments, a cohesion member interlocks the interior core layer with the outer skin layer or with both the inner skin layer and the outer skin layer.

Some embodiments provide methods in which the volumetric flow ratio of the inner to outer streams is controlled to create a cohesion member from the interior core stream. The cohesion member is a structural element that interlocks the interior core layer with the inner skin layer, with the outer skin layer, or with both to secure the interior core layer to the skin without the need for adhesive, or with a reduced need for adhesive. The interlocking effect of the cohesion member with the skin reduces or eliminates the need for adhesives and thereby improves the non-adhesive cohesion of the interior core layer with the inner and outer layers that form the skin. The cohesion member secures the interior core layer to the skin thereby increasing the adhesion of the interior core layer and the skin, preventing delamination, and thus reducing or eliminating the need for incorporating adhesives into the process of preparing the molded plastic article.

In some embodiments to form the cohesion member, the volumetric flow ratio of the inner and outer polymeric streams is adjusted to shift the interior core stream from flowing along one streamline to flowing along at least one other streamline. The volumetric flow ratio may be adjusted once or multiple times to obtain a single cohesion member, or may be adjusted multiple times to obtain multiple cohesion members along the interior core layer. In some embodiments, the volumetric flow ratio is changed by movement of the valve pin.

FIG. 4 depicts an exemplary cross-sectional view of a velocity profile 405 of polymeric stream 402 as it flows along a pathway 400 of a mold. As the polymeric stream 402 flows along, or is forced along the pathway 400, the highest velocity of the polymeric stream 403 is at the zero-gradient velocity streamline 406. Behind the flow front 404 the velocity of the polymeric stream slows as the flow moves away from the zero-gradient velocity streamline 406 and approaches either polymeric frozen layer 408 near the walls 412 of the pathway 400. The slowest portion of the velocity profile occurs at or near the polymeric frozen layer 408 of the pathway 400. The walls 412 of the pathway 400 form the shape of the molded part.

Figure 5:
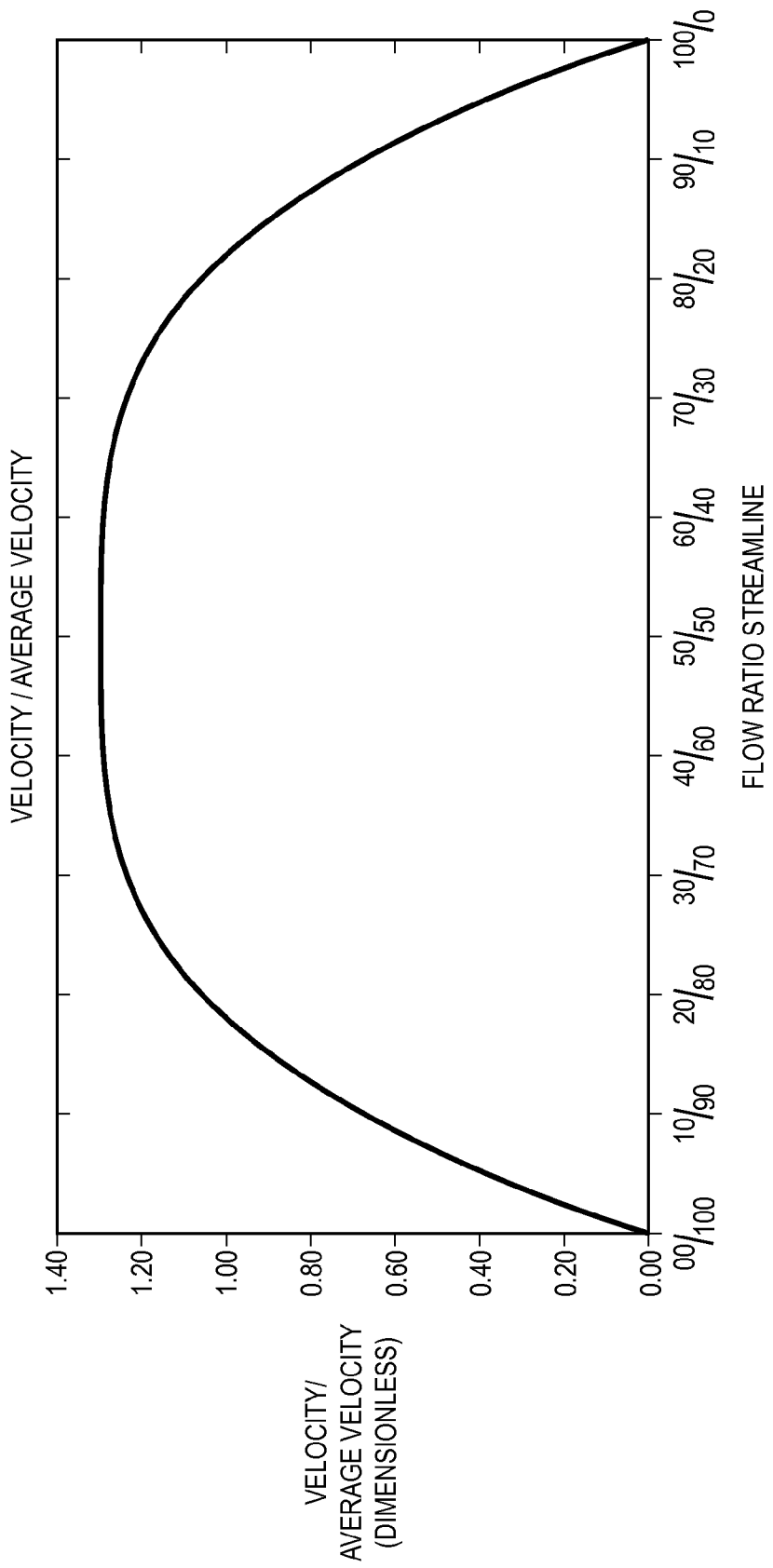
FIG. 5 is a graph of dimensionless velocity as a function of position in the flow layer for various streamlines along a composite flow.

FIG. 5 is a plot of the flow velocity at a streamline divided by the average velocity (i.e., dimensionless velocity) as a function of the volume flow ratio for the streamline. As illustrated by the plot, the highest flow velocity occurs at a ratio of 50:50 with the dimensionless flow velocity decreasing as the ratio moves away from 50:50 either toward 0:100 or toward 100:0.

FIGS. 6-10 depict cross-sectional views of a composite stream flowing along a mold pathway 500 with shifts of an interior core polymeric stream to different desired streamlines due to adjustments of the volumetric flow ratio at different times.

Figure 6:
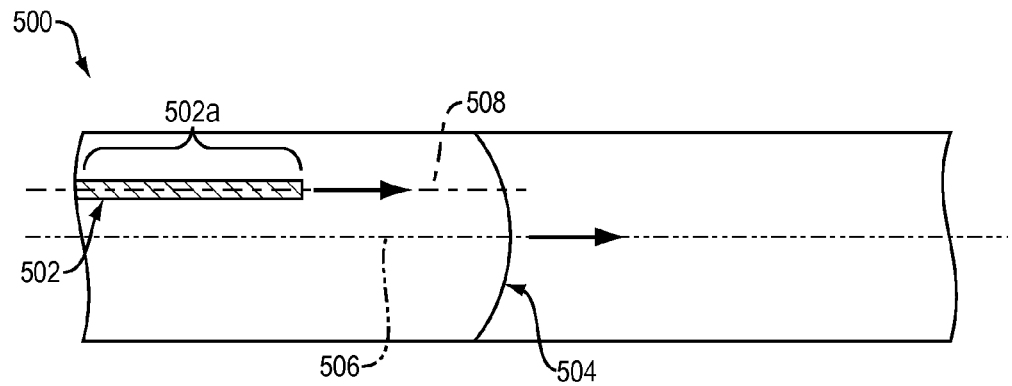
FIGS. 6 to 10 are cross-sectional views of a portion of a pathway in a mold cavity at successive times as a composite stream flows along the pathway and an interior polymeric stream of the composite stream is adjusted from one streamline to another to generate a cohesion member, in accordance with some embodiments.
Figure 7:
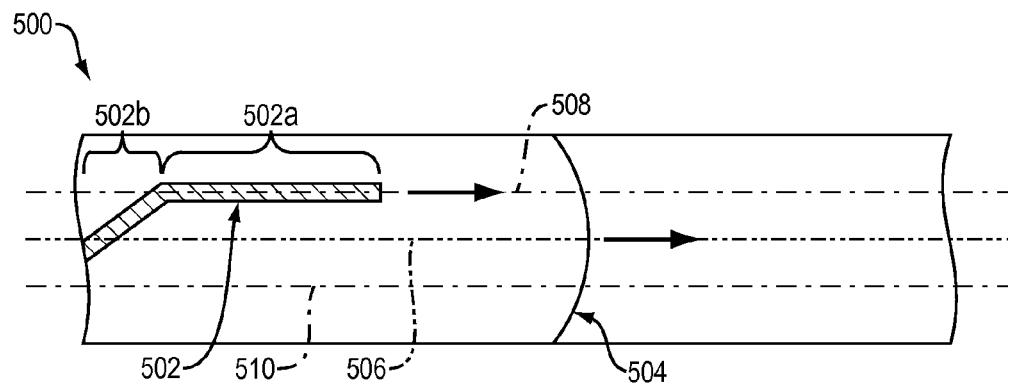
Figure 8:
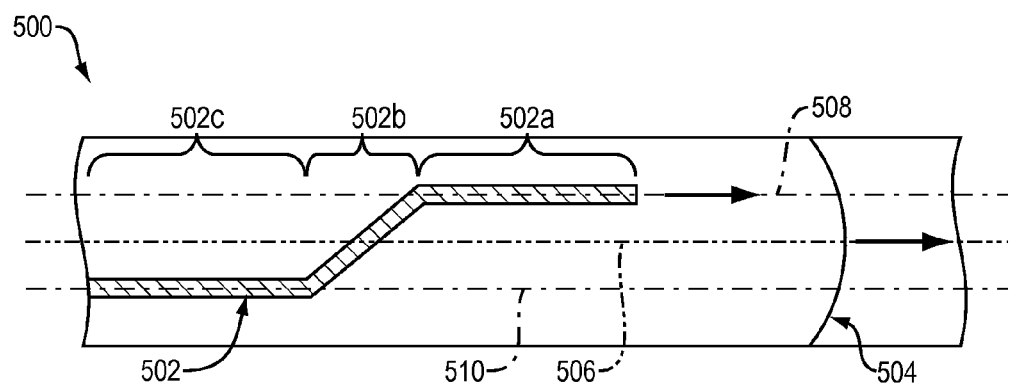

FIG. 6 depicts a composite stream flowing along a pathway. At time $T_0$, the interior core stream 502 is added to the composite stream and flows along a streamline 508 that is slower than the zero gradient velocity streamline 506 with respect to flow front 504. The first portion of the interior core stream flowing along slower streamline 508 is labeled 502a. At time $T_1$, the interior core stream 502 begins to shift to a second streamline 510. FIG. 7 shows the composite stream flowing along the pathway 550 after time $T_1$ including the first portion of the interior core stream 502a produced before $T_1$ flowing along streamline 508, and a second portion of the interior core stream 502b produced after $T_1$ as the interior core stream 502 was shifting from slower streamline 508 across the zero gradient velocity streamline 506 to another slower streamline 510. FIG. 8 shows the composite stream flowing along the pathway 550 after the interior core stream 502 has shifted to slower streamline 510 forming third portion 502c.

Figure 9:
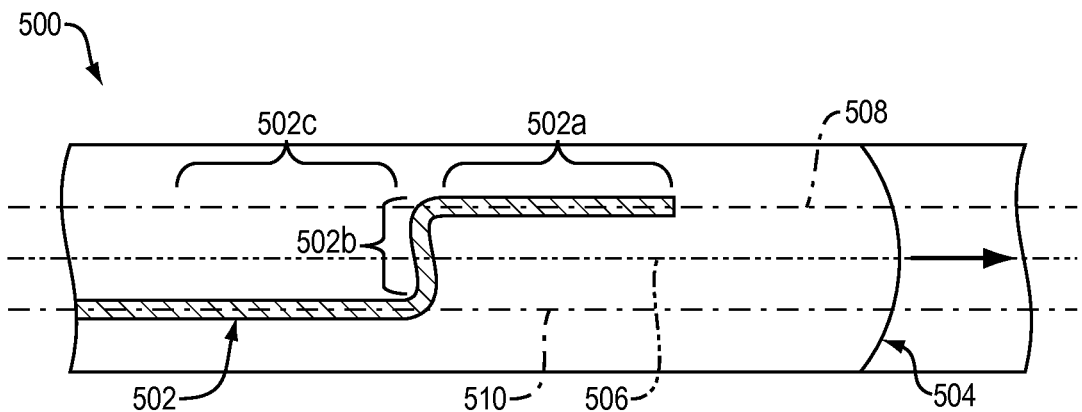
Figure 10:
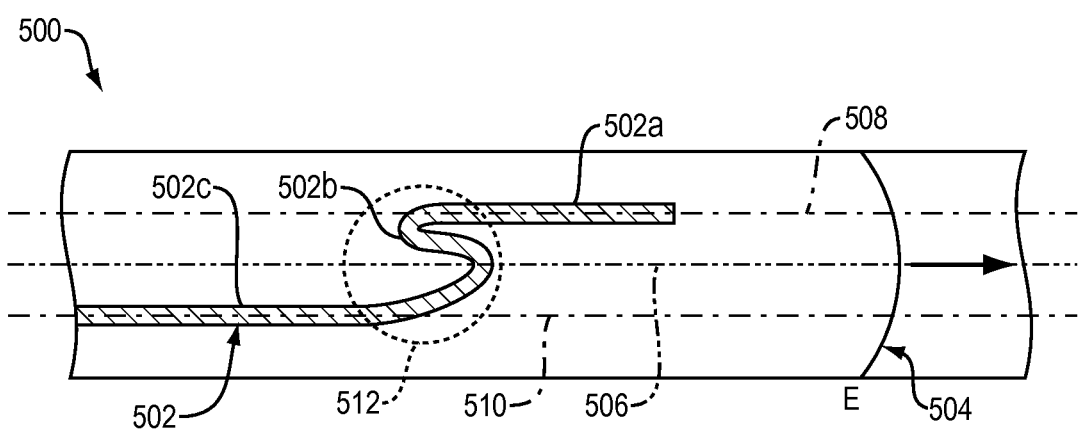

FIGS. 9 and 10 show that, as the flow front 504 continues to advance through the mold cavity pathway 500, the second portion of the interior core stream 502b moves faster than the earlier first portion 502a flowing along the slower streamline 508, and faster than the later third portion 502c flowing along the slower streamline 510, with the part of the second portion 502 on the zero gradient velocity streamline 508 moving the fastest. As the second portion of the interior core stream 502b catches up to the first portion of the interior core stream 502a, the second portion 502b folds over onto itself and forms a cohesion member having an s-shaped dog-leg 512, as shown in FIG. 10.

To form the cohesion member, the interior core polymeric stream is intentionally shifted from flowing along one streamline at time $T_0$ to flowing along at least one other streamline at a subsequent time $T_1$ such that the cohesion member is formed from the interior core stream. In some embodiments, the interior core stream is intentionally shifted multiple times to form the cohesion member from the interior core stream. Shifting the streamline along which the interior core stream flows is achieved by adjusting the volumetric flow ratio of the inner polymeric stream to the outer polymeric stream at desired time points. For example, the volumetric flow ratio of the inner to outer polymeric streams can be adjusted such that the interior core stream, at time $T_0$, flows along a first streamline. At time $T_1$, the volumetric flow ratio may be adjusted such that the interior core stream is shifted to flow along a second streamline. At time $T_2$, the volumetric flow ratio may be adjusted again such that the interior core stream is shifted to flow along a third streamline. One of ordinary skill in the art will understand, from the disclosure provided herein, that the volumetric flow ratio may be adjusted at additional time points as desired to form the desired number and types of cohesion members.

The shifting of the interior core flow stream can be accomplished with nozzle assemblies having a moveable valve pin, for example, the nozzle assemblies 100 and 200. The movable valve pin may be adjusted at multiple and various time intervals to obtain multiple cohesion members in the resulting plastic article as desired.

The plastic flow within a pathway of the mold cavity, while making an article, is highly laminar and the local velocity across the part thickness (combined polymeric stream) can be calculated for different conditions (i.e., material, temperature, injection speed, etc.). For instance, polymeric materials forming any of the interior core stream or the inner and outer streams may be selected for a specific viscosity to obtain a desired structural or cosmetic effect. For example, in some embodiments, the viscosity of the interior core flow may be between 100 and 400 Pa-sec.

As described above in relation to FIGS. 4 and 5, the highest velocity of the combined polymeric stream is at the 50:50 streamline with decreasing velocities for streamlines closer to the pathway walls. By placing the interior core stream at different streamline positions across the velocity profile, at different times, the velocities of various portions of the interior core stream can be adjusted, thereby controlling the final configuration of one or more resulting cohesion members. The flow thickness of the interior core stream may also be selected for desired width and thickness of the interior core/barrier layer in the resulting molded plastic article. For example, in some embodiments, the thickness of the interior core stream along the molded article cavity pathway, or the thickness of the resulting interior core layer in the molded part is about 10 microns to about 100 microns.

Figure 11:
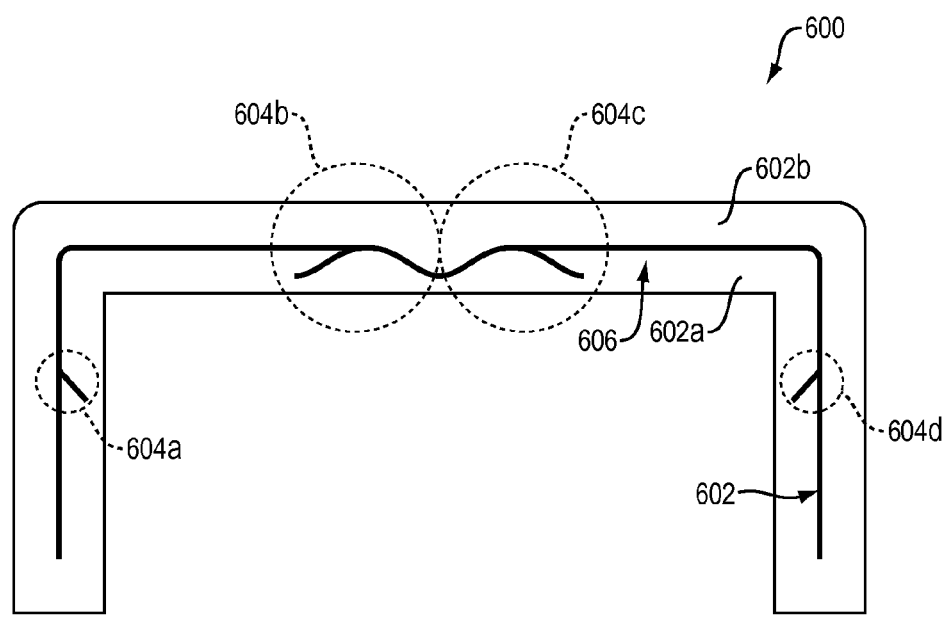
FIG. 11 is a cross-sectional view of an exemplary plastic article that has multiple cohesion member formed by some exemplary methods and systems described herein.

FIG. 11 is a cross-sectional view of an exemplary resulting plastic article 600 having an interior core layer 602 that forms multiple cohesion members 604A, 604B, 604C and 604D that structurally interlock with a skin 606 of the plastic article 600. Although this exemplary embodiment depicts cohesion members 604A, 604B, 604C, 604D that protrude into an inner layer 606a of the skin, other embodiments may have other configurations. For example, protrusions or other cohesion members may be formed on either side, or on both sides, of the interior core stream 602 (either the inner layer 606a, the outer layer 606b or both) and at various time points corresponding to various positions of the cohesion member(s) in the resulting article. The cohesion members may have single-, double-, triple- or otherwise multiple dog-leg configurations. A particular plastic article may have multiple protrusions or multiple single-, double-, triple- or otherwise multiple dog-leg configurations throughout the plastic article as desired.

In some embodiments, an interior core stream flowing along the zero gradient velocity streamline may be shifted away from the zero gradient velocity streamline. In this example, the shift away from the zero gradient velocity streamline is referred to as the first shift merely for identification and does not imply that the interior core stream had no prior shifts. Because the zero gradient velocity streamline is the fastest streamline, any shift away from the zero gradient velocity streamline will place the subsequent flow of the interior core layer along a slower streamline. The interior core stream may be intentionally shifted again to form the cohesion member. The second shift may be to a faster streamline or to a slower streamline than the first shift. For example, the second shift may be back to the original zero gradient velocity streamline.

In other embodiments, the interior core stream may be flowing along a streamline other than the zero gradient velocity streamline when the initial shift occurs. The volumetric flow ratio of the inner and outer streams can be adjusted to shift the interior core stream to a faster or slower streamline on the same side, or on the opposite side of the zero gradient velocity streamline. Further shifts may be made to faster or slower streamlines, which may lie on the same side or on the opposite side of the zero gradient velocity streamline. For example, when the interior core stream is shifted from a first streamline, on one side of the zero gradient velocity streamline, to the opposite side of the zero gradient velocity streamline, the portion of the interior core stream that flows along the zero gradient velocity streamline or close to the zero gradient velocity streamline catches up to the earlier, leading portion of the interior core stream that is flowing along the slower streamline. This causes the portion of the interior core stream flowing along or near the zero gradient velocity streamline to overlap the earlier, leading portion of the interior core stream, thereby creating the cohesion member. As another example, shifting the interior core stream from a first streamline to a second faster streamline, either across the zero gradient velocity stream or on the same side of the zero gradient velocity stream, allows the portion of interior core stream lying on the second faster streamline to at least partially catch up to the earlier, leading portion of the interior core stream flowing along the slower streamline thereby creating the cohesion member. The cohesion member secures the interior core layer to the skin thereby increasing the adhesion of the interior core layer and the skin, preventing, or reducing a risk of, delamination, thereby reducing or eliminating the need for incorporating adhesives into the process of preparing the molded plastic article.

The physical dimensions of a cohesion member are affected by many factors, which include, but are not limited to: the lateral separation between a pre-shift streamline and a post-shift streamline, the time interval between shifts, the time interval over which the shift is made, and a distance the cohesion member portion of the interior core flows from the nozzle to a position in the resulting article.

The width (W) of the cohesion member can be adjusted as by increasing or decreasing the lateral separation of the before-shift streamline and the after-shift streamline of the interior core stream. For example, a shift of the interior core stream from an 80:20 streamline to a 20:80 streamline would make a relatively wide, or relatively broad, cohesion member as compared to one made by shifting the interior core stream from a 60:40 streamline to a 40:60. As another example, shifting from a 40:60 streamline to a 70:30 would make a relatively wide, or relatively broad, cohesion member as compared to one made by shifting the interior core stream to shifting from a 40:60 streamline to a 55:45 streamline. As another example, a cohesion member created by shifting the interior core stream from the 60:40 streamline to the zero gradient velocity streamline would be narrower than a cohesion member created by shifting the 60:40 streamline to the 40:60 streamline.

The length (L) of the cohesion member can be adjusted by increasing or decreasing the time interval between each shift. For example a narrow cohesion member can be created by shifting the interior core stream from the zero gradient velocity streamline to the 40:60 streamline. A longer cohesion member can be created by allowing the interior core, after any shift, to flow along the desired streamline for a longer period of time while a shorter cohesion member can be created by allowing the interior core, after any shift, to flow along the desired streamline for a shorter period of time.

Figure 12:
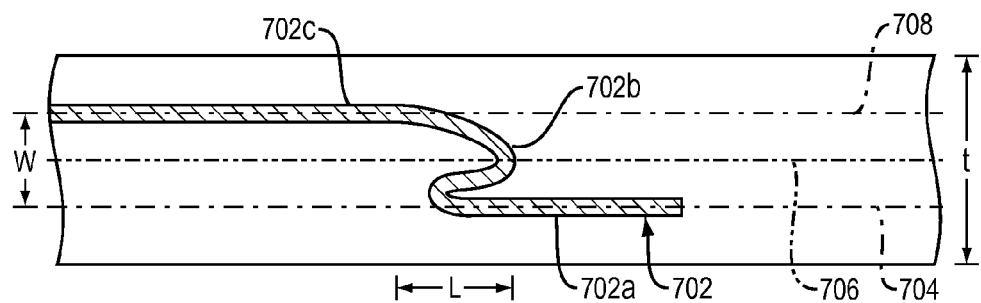
FIG. 12 is a cross-sectional view of an exemplary interior core stream adjusted to form a cohesion member in which a characteristic length (L) of the cohesion member is of the same magnitude, or less than, the local thickness (T) of the combined stream.

FIG. 12 depicts an exemplary dog-leg cohesion member 700 created by shifting an interior core stream from a first slow streamline 704, across the zero gradient velocity streamline 706, and to a second slow streamline 708 during injection molding. The resulting article has a first portion of an interior core layer 702a formed from a first interior core stream portion flowing along the first streamline 704, a second portion of the interior core layer 702b formed from a second interior core stream portion flowing along streamlines between the first slow streamline 704 and the second slow streamline 708, and a third portion of the interior core layer 702c formed from a third interior core stream portion flowing along the third streamline 704. The separation between the first slow streamline 704 and the second slow streamline 708 determines the width (W) of the cohesion member 700. In this example, the length (L) of the single dog-leg cohesion member in the resulting article is based, at least in part, on the distance that the second interior core stream portion flowed along the path from the nozzle to its position in the final article.

In a resulting article, a force between an interior core layer and skin layers is increased for a dog-leg cohesion member having a characteristic length of the same magnitude, or less than, the local thickness, thereby increasing cohesion and increasing the resistance of the molded plastic article to delamination. For example, in FIG. 12 the characteristic length (L) of the dog-leg cohesion member is about the same magnitude as the local thickness (T) at the cohesion member.

In some embodiments, an interior core stream is shifted across the zero gradient velocity streamline more than once to create a cohesion member having double dog-leg configuration.

Figure 13:
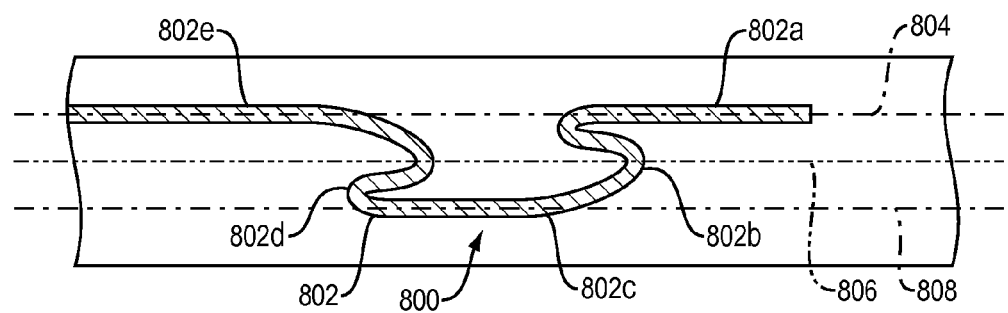
FIG. 13 is a cross-sectional view of an exemplary plastic article having a double dog-leg configuration cohesion member formed by some methods and systems described herein.

FIG. 13 depicts an exemplary cohesion member 800 having a double dog-leg configuration. At time $T_0$ an interior core stream 802 is traveling along a streamline 804 that is slower than the zero-gradient velocity streamline 806 forming a first interior core stream portion 802a. At time $T_1$, the interior core stream 802, is shifted across the zero gradient velocity streamline 806 to another streamline 808 forming a second interior core stream portion 802b, where it is allowed to flow for a desired time interval from $T_1$ to $T_2$, forming a third interior core stream portion 802c. At time $T_2$, the interior core stream 802 is again shifted across the zero gradient velocity streamline 806 to the same streamline 804 as at time $T_0$, or near the same streamline as the streamline at time $T_0$, forming a fourth interior core stream portion 802d, and allowed to continue flowing on this streamline 804 forming a fifth interior core stream portion 802e. This double-shift across the zero gradient velocity streamline 806 forms the cohesion member 800 having a double dog-leg configuration.

Some exemplary methods and systems include controlling the volumetric flow ratio of the inner and outer streams to create the cohesion member. In the exemplary nozzle assemblies depicted in FIGS. 1 and 2, valve pins 102 and 202, respectively, are adjusted toward or away from a nozzle egress port to control the volumetric flow rate of the inner and outer polymeric material streams in the combined polymeric stream during ejection of the combined polymeric stream from the nozzle into the mold cavity. In controlling the volumetric flow rates of the inner and outer streams, the volumetric flow ratio is adjusted such that the interior core stream is shifted to desired streamlines within the combined polymeric stream. For example, by adjusting the position of the valve pin based on a desired volumetric flow ratio and placement of the interior core stream, the interior core stream can be placed at a first streamline at time $T_0$, and at a later time $T_1$ shifted to a second streamline. At time $T_2$, subsequent to time $T_1$, the streamline of the interior core can again be shifted to a third streamline by adjusting the valve pin based on the new desired volumetric flow ratio. Further adjustments are likewise possible at additional time points to create one or more additional cohesion member(s) from the interior core as desired.

III. Examples

The following illustrations are provided as non-limiting examples of how to intentionally form different types of cohesion members.

In some exemplary embodiments, an interior core stream is adjusted from a first streamline across the zero-gradient velocity streamline to a second streamline, and then adjusted back across the zero-gradient velocity streamline to a third streamline, thereby forming a double dog-leg shaped cohesion member (e.g., see FIG. 13). Controlling the interior core stream may include adjusting the volumetric flow ratio of the inner to outer streams by adjusting the valve pin in the nozzle to obtain a first volumetric flow ratio that places the interior core stream at a first streamline away from the zero-gradient velocity streamline at time $T_0$, and adjusting the valve pin at time $T_1$ to obtain a second volumetric flow ratio that places the interior core stream at a second streamline that is across the zero-gradient velocity (50:50) streamline from the first streamline. At a later time $T_2$, the valve pin is further adjusted to obtain a third volumetric flow ratio that shifts the interior core stream back across the zero-gradient velocity streamline to a third streamline, which may be the same as or different from the first streamline. As explained above with respect to FIG. 12, shifting the interior core stream from a slower streamline across the zero gradient velocity streamline to a different streamline, and then back across the zero gradient velocity streamline to a slower streamline forms a cohesion member having a double dog-leg configuration.

For example, the interior core stream may be shifted from the 80:20 streamline to the 20:80 streamline, and then back to the 80:20 streamline. In another example, the first streamline may be one of the 20:80, 25:75, and 40:60 streamlines, the second streamline may be one of the 60:40, 75:25, and 20:80 streamlines, and the third streamline may be one of the 20:80, 25:75, and 40:60 streamlines. In another example, the first streamline may be one of the 60:40, 75:25, and 20:80 streamlines, the second streamline may be one of the 20:80, 25:75, and 40:60 streamlines, and the third streamline may be one of the 60:40, 75:25, and 20:80 streamlines. Other exemplary volumetric flow ratios may be employed in which the second streamline is across the zero-gradient velocity streamline from the first streamline and from the third streamline. Those skilled in the art will readily appreciate that the specific exemplary details are only illustrative and are not meant to limit the invention as described herein, which is defined by the claims which follow thereafter.

The volumetric flow ratios described herein are illustrative and one of ordinary skill in the art will appreciate that other volumetric flow ratios are possible. For example, the flow ratios may vary incrementally from about 5:95 to about 95:5 and may include all increments within that range.

It should be noted that the size of the adjustment of the volumetric ratio may depend on which phase of molding is occurring during adjustment. For example, the adjustment of the volumetric ratio may be less than 30:70 or greater than 70:30 during the filling phase to create a cohesion member. It should also be noted that 60:40 or 40:60 streamline during the filling phase becomes the 80:20 or 20:80 streamline during the packing phase due to the thickness of frozen polymeric material on the walls of the mold cavity during the packing phase. A cohesion member may be formed in either or both of the filling phase and the packing phase.

In some exemplary embodiments, an interior core stream is adjusted from a first streamline to a faster second streamline without crossing the zero-gradient velocity streamline, and then adjusted to a slower third streamline without crossing the zero gradient velocity stream, thereby forming a double dog-leg shaped cohesion member. In some embodiments, the interior core stream is placed at a first streamline at time $T_0$, and then at time $T_1$, the volumetric flow ratio is adjusted by adjusting the valve pin to shift the interior core stream to a faster second streamline that is not across the zero-gradient velocity streamline from the first streamline. At a later time $T_2$, the valve pin is further adjusted to shift the interior core stream to a slower third streamline that is the same as the first streamline, or that lies on the same side of the zero-gradient velocity streamline as the first streamline. Shifting the interior core stream from a slow first streamline to a faster second streamline at time $T_1$, and then shifting the interior core stream to a slower third streamline at a time $T_2$ without crossing the zero-gradient velocity streamline forms a double dog-leg configuration cohesion member.

For example, the volumetric flow ratio of the inner to outer polymeric streams may be adjusted such that at time $T_0$, the volumetric flow ratio is between about 20:80 and about 50:50. At time $T_1$, the volumetric flow ratio is adjusted to between about 50:50 and about 80:20. A single dog-leg configuration cohesion member is created from the single shift from a first slower streamline across zero-gradient velocity streamline to a second slower streamline.

For example, shifting the interior core stream from the 20:80 streamline to the 40:60 streamline and then back to the 20:80 streamline creates a double dog-leg cohesion member. As another example, shifting the interior core stream from the 80:20 streamline to the 60:40 streamline and then to the 70:30 streamline creates a double dog-leg cohesion member. As another example, the interior core stream may be shifted from the 70:30 streamline to the 50:50 streamline, and then back to the 70:30 streamline to create a double dog-leg cohesion member.

As another example, an interior core stream flowing along a first streamline that lies in the range of the 20:80 to 40:60 streamlines at $T_0$, may be adjusted at time $T_1$ to flow along a faster second streamline that lies between the first streamline and the zero-gradient velocity streamline or on the zero-gradient velocity streamline. At a time T2, the interior core stream may be adjusted to flow along a third streamline that lies between the second streamline and the 20:80 streamline, thereby forming a double dog-leg cohesion member in the resulting article.

As another example, an interior core stream flowing along a first streamline that lies in the range of the 80:20 to 60:40 streamlines at $T_0$, may be adjusted at time $T_1$ to flow along a faster second streamline that lies between the first streamline and the zero-gradient velocity streamline or on the zero-gradient velocity streamline. At a time T2, the interior core stream may be adjusted to flow along a third streamline that lies between the second streamline and the 80:20 streamline, thereby forming a double dog-leg cohesion member in the resulting article. Other exemplary volumetric flow ratios may be employed to create a double dog-leg configuration cohesion member by shifting the interior core stream from a slow streamline to a faster streamline and back to a slower streamline without crossing the zero-gradient velocity gradient (the 50:50) streamline. Those skilled in the art will readily appreciate that the specific exemplary details are only illustrative and are not meant to limit the invention as described herein, which is defined by the claims.

In some embodiments, such as that depicted in FIG. 3, the interior core stream is flowing along the 50:50 streamline at time $T_0$ and is subsequently adjusted to a slower streamline at time $T_1$ then adjusted back to the 50:50 streamline at time $T_2$. A cohesion member with a protrusion configuration is formed in this manner.

In some embodiments, where the volumetric flow ratio at time $T_0$ is about 50:50, the volumetric flow ratio is adjusted at time $T_1$ to a volumetric flow ratio that is less than about 50:50 such that the interior core stream is biased towards the inner polymeric stream and at time $T_2$ the volumetric flow ratio is adjusted to be between about 50:50 and the volumetric flow ratio at time $T_1$.

In some embodiments, where the volumetric flow ratio at time $T_0$ is about 50:50, the volumetric flow ratio is adjusted at time $T_1$ to a volumetric flow ratio that is greater than about 50:50 such that the interior core stream is biased towards the outer polymeric stream and at time $T_2$ the volumetric flow ratio is adjusted to be between about 50:50 and the volumetric flow ratio at time $T_1$.

In some exemplary embodiments, a single dog-leg cohesion member is formed by shifting an interior core stream from a first streamline, across the zero gradient velocity gradient to a second streamline (e.g., see FIG. 12). For example, at time $T_0$, the interior core stream is flowing along a first streamline in which the volumetric flow ratio is between about 20:80 and about 80:20. At time T1, the volumetric flow ratio is adjusted by adjusting the valve pin to shift the interior core stream to a second streamline across the zero-gradient velocity streamline from the first streamline, thereby forming a single dog-leg configuration cohesion member. Shifting the interior core stream from a slow streamline across a faster streamline to another slow streamline forms a single dog-leg configuration cohesion member. As another example, shifting the interior core stream from a first streamline, which lies between about the 20:80 and 80:20 streamlines, across the zero-gradient velocity streamline to a second streamline, which lies between about the 80:20 and 20:80 streamlines, creates a single dog-leg cohesion member. Other exemplary volumetric flow ratios may be employed to create a single dog-leg configuration cohesion member by shifting the interior core stream from a first streamline across a faster streamline (e.g., the zero-gradient velocity streamline) to a second streamline slower than the faster streamline. Those skilled in the art will readily appreciate that the specific exemplary details are only illustrative and are not meant to limit the invention as described herein, which is defined by the claims which follow thereafter.

The timing of the adjustments in volumetric flow ratio may be selected as desired to obtain the desired effect. In certain embodiments, the time between $T_0$ and $T_1$, for example is between about 10 to 100 milliseconds and between $T_1$ and $T_2$ is between about 10 and 100 milliseconds.

In certain other aspects, the exemplary methods and systems described herein form a cosmetic effect in the resulting plastic article. For example, in certain embodiments, the polymeric material which forms the interior core stream may be adjusted to have a desired color (e.g., white) or texture in the resulting plastic article. The color of the polymeric material may be adjusted by adding various colors or texture adjusting materials. In some embodiments, color is red, blue, yellow, green or any mixture thereof. The inner and outer layers may likewise be adjusted to achieve the desired cosmetic effect. In certain embodiments, the interior core layer is visually distinguishable from the inner and outer layers of the skin.

The cosmetic effect is formed by the interlocking effect of the cohesion member with the skin and also by the texture and color of the interior core stream and the inner and outer layers.

Those skilled in the art will readily appreciate that the specific exemplary details are only illustrative and are not meant to limit the invention as described herein, which is defined by the claims which follow thereafter.

Figure 14:
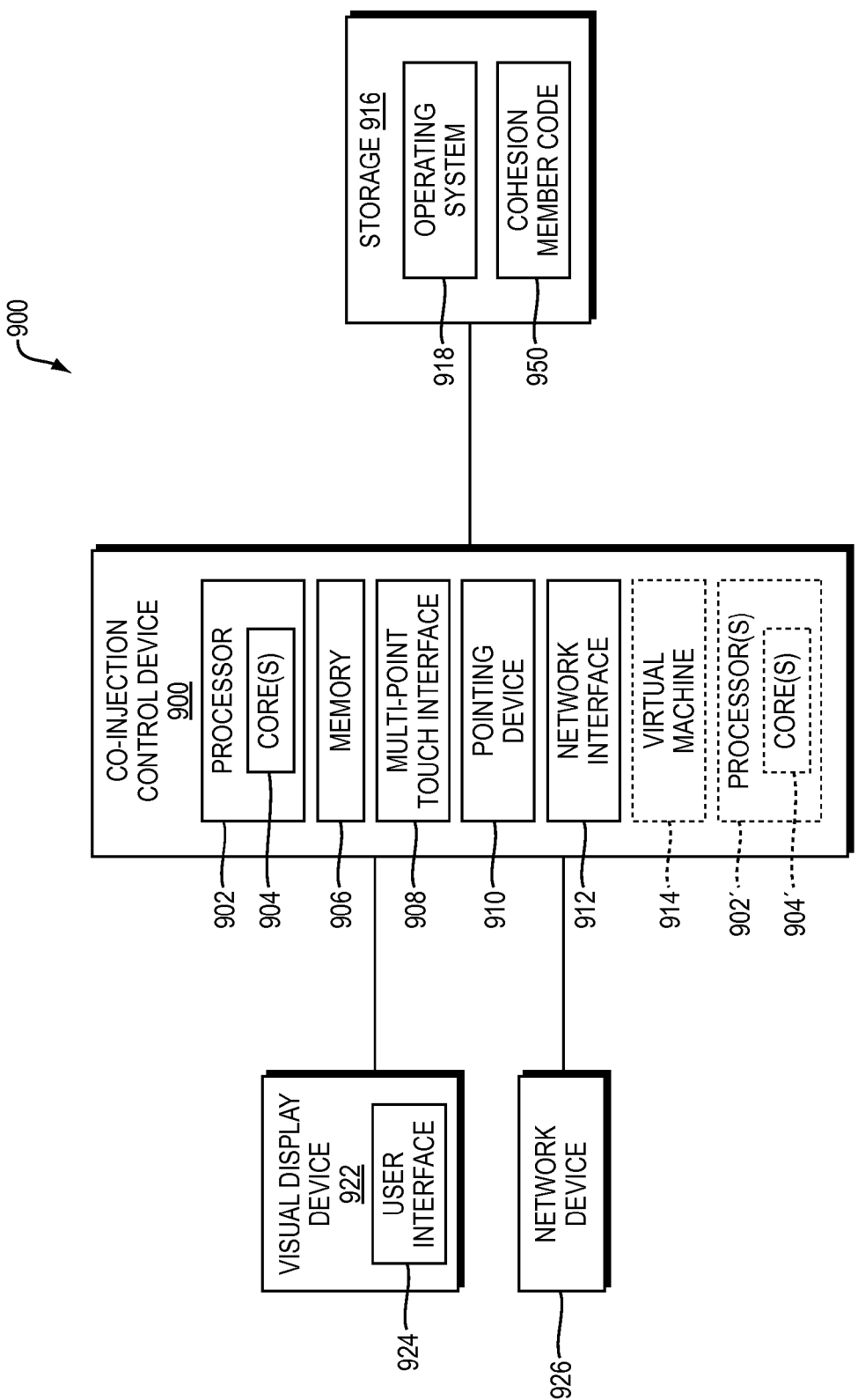
FIG. 14 illustrates an exemplary computing environment suitable for practicing embodiments taught herein.

FIG. 14 illustrates an exemplary computing environment suitable for practicing exemplary embodiments taught herein. The environment may include a co-injection control device 900 coupled, wired, wirelessly or a hybrid of wired and wirelessly, to co-injection system 1400. The co-injection control device 900 is programmable to implement executable Cohesion Member Code 950 for forming a cohesion member as taught herein. Co-injection control device 900 includes one or more computer-readable media for storing one or more computer-executable instructions or software for implementing exemplary embodiments. The computer-readable media may include, but are not limited to, one or more types of hardware memory, non-transitory tangible media, etc. For example, memory 906 included in the co-injection control device 900 may store computer-executable instructions or software, e.g., instructions for implementing and processing every module of the executable Flow Control Code 950. Co-injection control device 900 also includes processor 902 and, one or more processor(s) 902' for executing software stored in the memory 906, and other programs for controlling system hardware. Processor 902 and processor(s) 902' each can be a single core processor or multiple core (904 and 904') processor.

Virtualization may be employed in co-injection control device 900 so that infrastructure and resources in the computing device can be shared dynamically. Virtualized processors may also be used with the executable Cohesion Member Code 950 and other software in storage 916. A virtual machine 914 may be provided to handle a process running on multiple processors so that the process appears to be using only one computing resource rather than multiple. Multiple virtual machines can also be used with one processor.

Memory 906 may comprise a computer system memory or random access memory, such as DRAM, SRAM, EDO RAM, etc. Memory 906 may comprise other types of memory as well, or combinations thereof.

A user may interact with co-injection control device 900 through a visual display device 922, such as a computer monitor, which may display the user interfaces 924 or any other interface. The visual display device 922 may also display other aspects or elements of exemplary embodiments, e.g. the databases, the enrollment forms, the medication guide, etc. Co-injection control device 900 may include other I/O devices such a keyboard or a multi-point touch interface 908 and a pointing device 910, for example a mouse, for receiving input from a user. The keyboard 908 and the pointing device 910 may be connected to the visual display device 922. Co-injection control device 900 may include other suitable conventional I/O peripherals. Co-injection control device 900 may further comprise a storage device 916, such as a hard-drive, CD-ROM, or other non-transitory computer readable media, for storing an operating system 918 and other related software, and for storing executable Cohesion Member Code 950.

Co-injection control device 900 may include a network interface 912 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 912 may comprise a built-in network adapter, network interface card, PCMCIA network card, card bus network adapter, wireless network adapter, USB network adapter, modem or any other device suitable for interfacing authorization computing device 900 to any type of network capable of communication and performing the operations described herein. Moreover, co-injection control device 900 may be any computer system such as a workstation, desktop computer, server, laptop, handheld computer or other form of computing or telecommunications device that is capable of communication and that has sufficient processor power and memory capacity to perform the operations described herein.

Co-injection control device 900 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

In some embodiments, Cohesion Member Code 950 includes code executable by the processor 902 to control the co-injection system 1400 to selectively control a volumetric flow volume of the inner and outer polymeric streams, control a position of the interior core stream relative to a velocity flow front of the combined polymeric stream and control extrusion start time of the interior core stream relative to the extrusion start time of the inner and outer polymeric streams as taught herein. That is, Cohesion Member Code 950 includes executable code executable by the processor 902 to control the co-injection system 1400 to selectively form one or more cohesion members to adhere the interior core layer of the resulting molded plastic article with the inner layer or outer layer of the resulting molded plastic article without adhesive. For example, in some embodiments, execution of the Cohesion Member Code 950 by the processor 902 allows the co-injection system 1400 to intentionally shift the interior core stream between various flow streams during injection to form one or more cohesion members.

In some embodiments, Cohesion Member Code 950 includes code executable by the processor 902 to control the co-injection system 1400 to create one or more pulsations in thickness in the interior core stream. For example, in some embodiments, the Cohesion Member Code 950 provides instructions to injection units associated with the first material source and/or with the second material source to control an injection velocity of the first source material and or the second source material to intentionally produce the one or more pulsations in the interior core material stream. As another example, in some embodiments, the Cohesion Member Code 950 provides instructions to alter a flow resistance for the interior stream relative to a flow resistance for the inner stream and for the outer stream to pulse the volumetric flow ratios creasing one or more pulsations in the interior stream.

Methods and co-injection systems taught herein facilitate the co-injection molding of plastic articles (e.g., food or beverage containers) whereby the interior core stream forms a structural element that secures the interior core layer to the inner layer and/or the outer layer to prevent delamination of the resulting molded plastic article. Further, the formation of the cohesion member can create visual effects in the resulting molded plastic article. Formation of the cohesion member may reduce or eliminate the need for adhesive compounded into the polymeric materials used to form the resulting molded plastic article.

Figure 15:
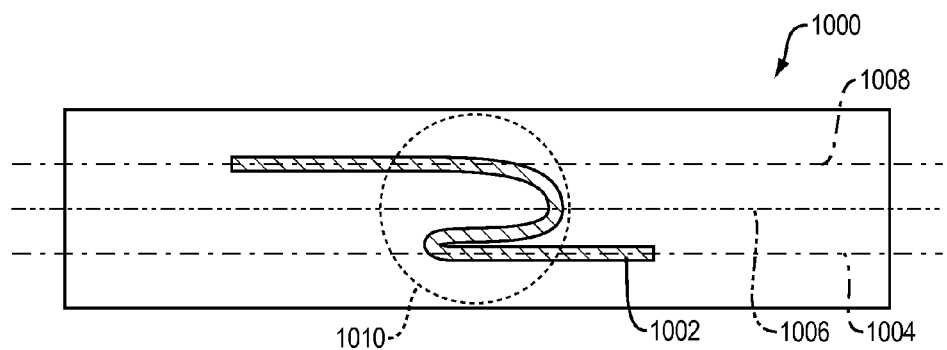
FIG. 15 is a cross-sectional view of a portion of an exemplary plastic article having a single dog-leg configuration cohesion member formed by some methods and systems described herein.

FIG. 15 depicts a cross-sectional view of a portion of an exemplary plastic article 1000 having an interior core layer 1002 with a cohesion member 1010. The cohesion member 1010 has a single dog-leg configuration formed from a single adjustment of the volumetric flow ratio that shifted the interior core stream from a slower first streamline 1004 across the zero-gradient velocity streamline 1006 to a faster second streamline 1008 located closer to the zero-gradient velocity streamline 1006. The portion of the interior core stream traveling along the faster streamlines between the first streamline 1004 and the second streamline 1008, and a leading portion of the interior core stream traveling along the second streamline 1008, caught up to the portion of the interior core stream travelling along the slower streamline 1004 and overlapped to form the cohesion member 1010 with the single dog-leg configuration.

Figure 16:
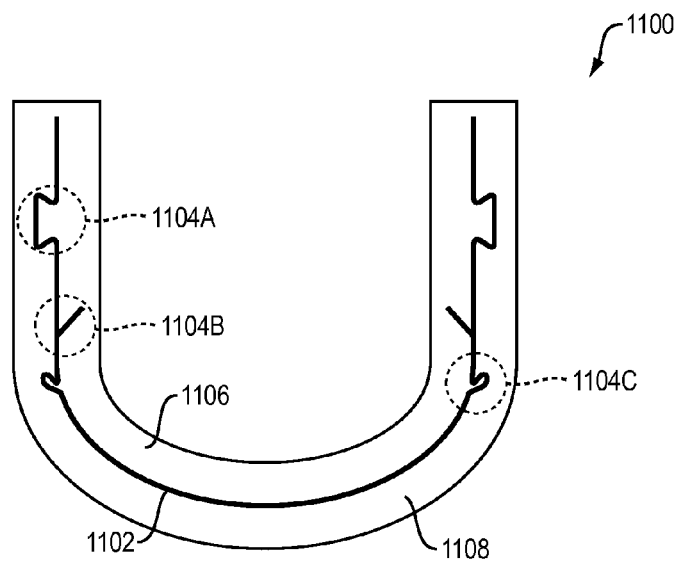
FIG. 16 is a cross-sectional view of an exemplary plastic article formed as a container having multiple cohesion members formed using some methods and systems described herein.

FIG. 16 illustrates a cross-sectional view of a resulting plastic article formed as a container 1100 from the systems and methods described herein. Although, container 1100 includes an interior core 1102 with six cohesion members, in other embodiments, the container 1100 can be formed with any number of cohesion members dependent on the size of the container. For example, a container can have one cohesion member, two cohesion members, three cohesion members, four cohesion members, five cohesion members or more. Further, a container may include only one type of cohesion member or multiple different types of cohesion members. As illustrated by FIG. 16, exemplary cohesion members formable in the container 1100 include, but are not limited to, a double dog-leg configured cohesion member 1104A, a protrusion configured cohesion member 1104B, and a single dog-leg configured cohesion member 1104C. Each the cohesion members 1104A, 1104B and 1104C secures the interior core 1102 to the inner layer 1106 or to the outer layer 1108 to prevent or reduce the occurrence of delamination, and to reduce or eliminate the need for adhesives compounded into the polymeric material forming the interior core and/or the skin.

Figure 17:
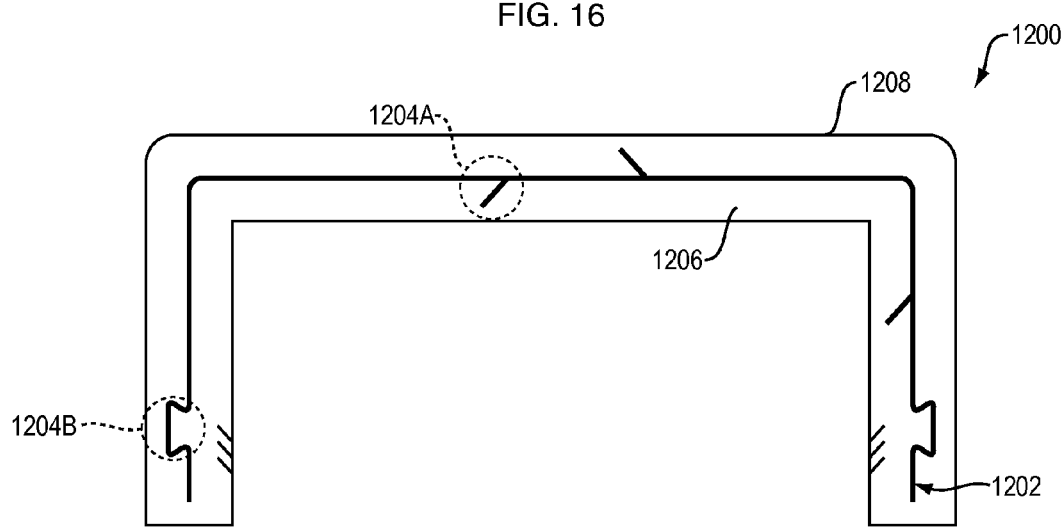
FIG. 17 is a cross-sectional view of an exemplary plastic article formed as a closure device having multiple cohesion members formed using some methods and systems described herein.

FIG. 17 illustrates a cross-sectional view of a resulting plastic article formed as a covering mechanism 1200, such as, for example, a bottle cap or other closure device for covering or closing an opening in a container. Covering mechanism 1200 includes an interior core layer 1202 with several cohesion members, such as, for example, a protrusion configured cohesion member 1204A and a double dog-leg configured cohesion member 1204B. The cohesion members such as for example 1204A and 1204B secure the interior core layer 1202 to the inner layer 1206 and/or to the outer layer 1208 of the covering mechanism 1200 to prevent delamination with a reduced, or eliminated need for adhesives in the materials of the interior core layer, the inner layer and/or the outer layer.

Figure 18:
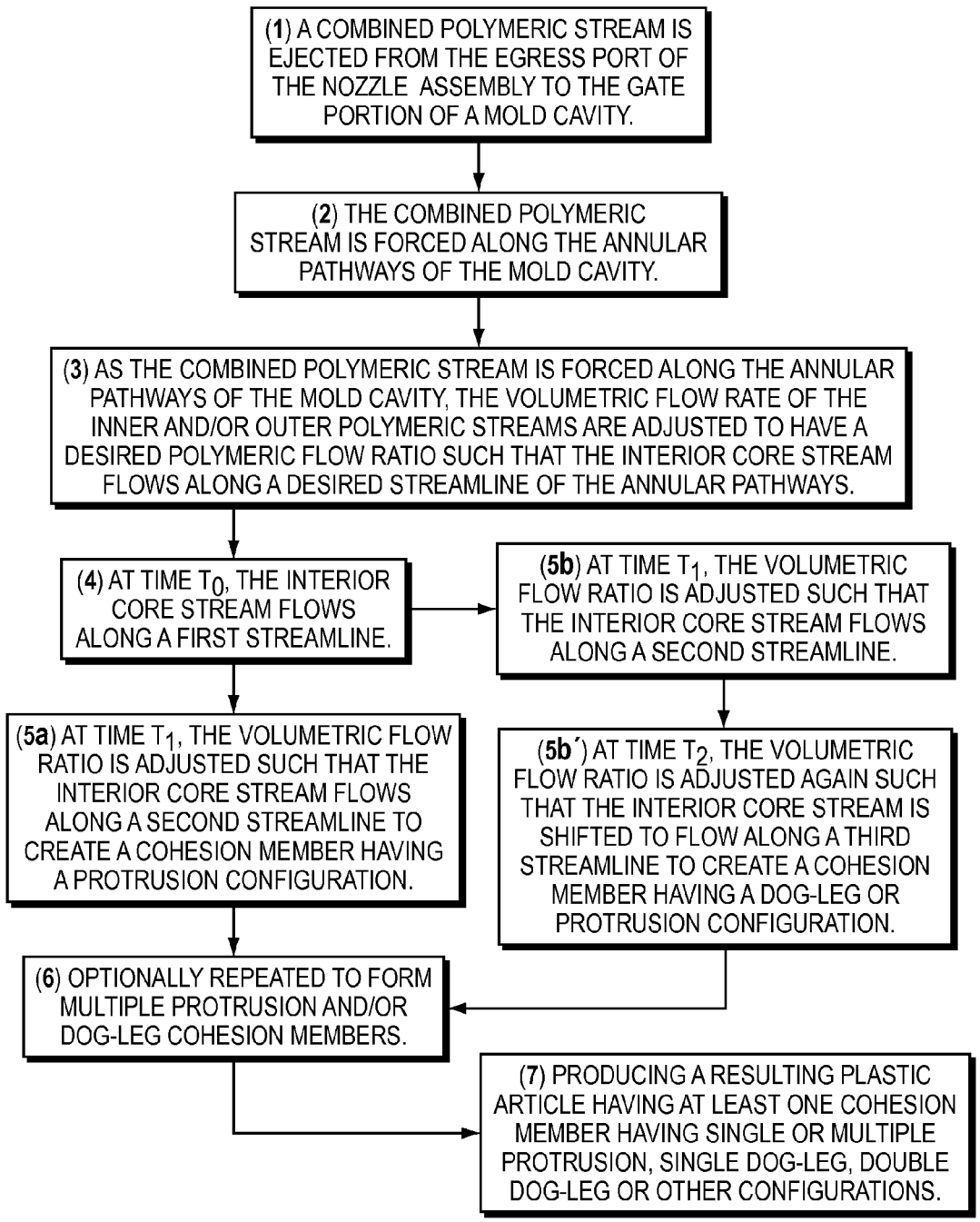
FIG. 18 is a flow chart schematically depicting the production of certain exemplary plastic articles using the methods and systems described herein.

FIG. 18 schematically illustrates an exemplary flow chart of steps involved in forming a plastic article having one or more cohesion members. In step (1) A combined polymeric stream is ejected from the egress port of a nozzle assembly to the gate portion of a mold cavity. (2) The combined polymeric stream is forced along the annular pathways of the mold cavity. (3) As the combined polymeric stream is forced along the annular pathways of the mold cavity, the volumetric flow rate of the inner to outer polymeric streams is adjusted to have a desired polymeric flow ratio such that the interior core stream can be shifted to flow along a desired streamline of the annular pathways. (4) At time $T_0$, the interior core stream flows along a first streamline. At time $T_1$, the volumetric flow ratio is adjusted such that the interior core stream flows along a second streamline to create a cohesion member having a protrusion configuration.

Alternatively, (5b') at time $T_2$, the volumetric flow ratio is adjusted again such that the interior core stream is shifted to flow along a third streamline to create a cohesion member having a dog-leg, or protrusion configuration. Either alternatives may be repeated (6) individually or in combination to form multiple protrusions and/or dog-leg cohesion members. The resulting plastic article is produced (7) having at least one cohesion member having a single or multiple protrusion, single dog-leg, double dog-leg or other configurations.

Figure 19:
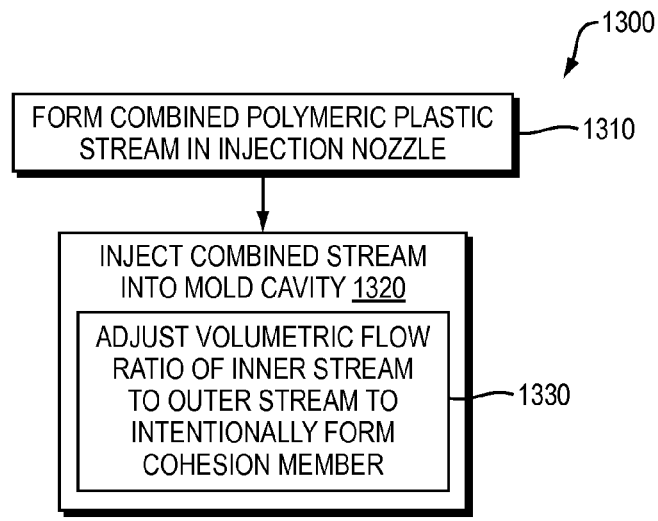
FIG. 19 is a flow chart schematically depicting a method of co-injection molding a multilayer plastic article having a plurality of cohesion members, in accordance with some embodiments.

FIG. 19 schematically depicts a method 1300 of co-injection molding a multilayer plastic article having a plurality of cohesion members, in accordance with some embodiments. In method 1300, a combined polymer plastic stream is formed in an injection nozzle (step 1310). The combined stream includes an interior core stream of a first polymeric material encased by an inner stream of a second polymeric material and an annular outer stream of the second polymeric material. The combined stream is injected into a mold cavity (step 1320). During injection of the combined stream into the mold cavity, the volumetric flow ratio of the inner stream to the outer stream is adjusted to intentionally form the cohesion member from the interior core stream (step 1330). The resulting cohesion member structurally interlocks an interior core layer with an inner skin layer, with an outer skin layer or with both in the resulting article.

Figure 20:
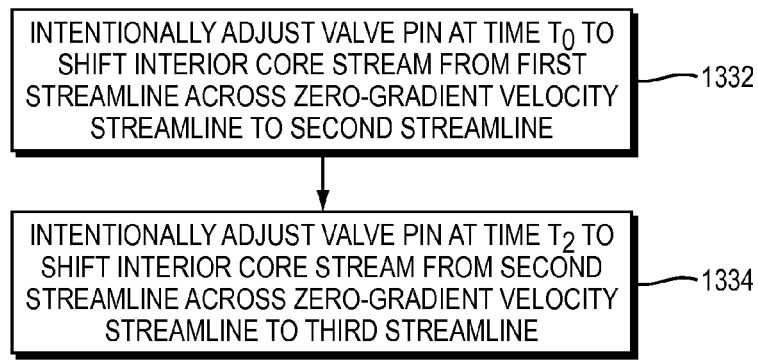
FIG. 20 is a flow chart schematically depicting steps that may be performed in adjusting a volumetric ratio of the inner stream to the outer stream to intentionally form a cohesion member, in accordance with some embodiments.

FIG. 20 schematically depicts steps that may be included in adjusting the volumetric flow ratio, in accordance with some embodiments. A valve pin may be adjusted at a time $T_1$ to intentionally shift the interior core stream from flowing along a first streamline with a volumetric flow ratio between about 5:95 and about 95:5 across a streamline at a zero-gradient of a velocity profile of a flow front of the combined polymeric plastic stream (the zero-gradient of velocity streamline) to flowing along a second streamline (step 1332). In some embodiments, intentionally adjusting the volumetric flow ratio further includes adjusting the valve pin at a later time $T_2$ to shift the interior core stream from flowing along the second streamline to flowing along a third streamline (step 1334).

Figure 21:
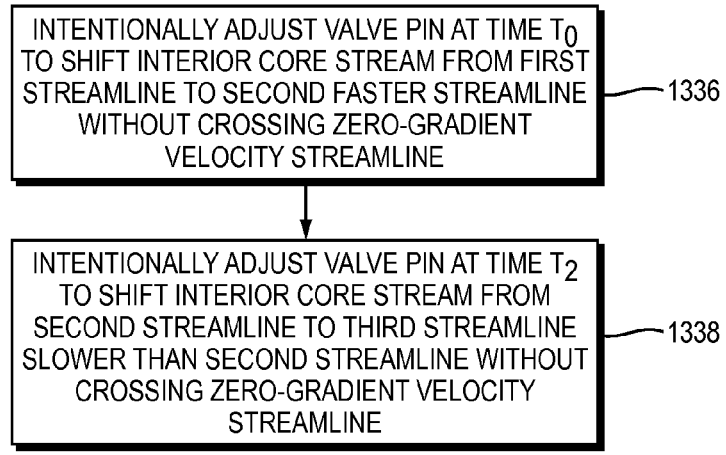
FIG. 21 is a flow chart schematically depicting other steps that may be performed in adjusting a volumetric ratio of the inner stream to the outer stream to intentionally form a cohesion member, in accordance with some embodiments.

FIG. 21 schematically depicts alternative steps that may be included in adjusting the volumetric flow ratio, in accordance with some embodiments. A valve pin may be adjusted at a time $T_1$ to intentionally shift the interior core stream from flowing along a first streamline with a volumetric flow ratio between about 5:95 and about 95:5 to flowing along a second streamline that has a velocity greater than the first streamline without crossing the zero-gradient velocity streamline (step 1336). In some embodiments, intentionally adjusting the volumetric flow ratio further includes adjusting the valve pin at a later time $T_2$ to intentionally shift the interior core stream from flowing along the second streamline to flowing along a third streamline (step 1338).

In some embodiments, the time interview between time $T_1$ and time $T_2$ is between about 5 milliseconds and about 50 milliseconds. In some embodiments, the third streamline is across the zero-gradient velocity streamline from the second streamline and the second streamline is away from the zero-gradient velocity streamline. The velocity along the third streamline may be less than the velocity along the second streamline. In some embodiments, the third streamline is the same as the first streamline.

Figure 22:
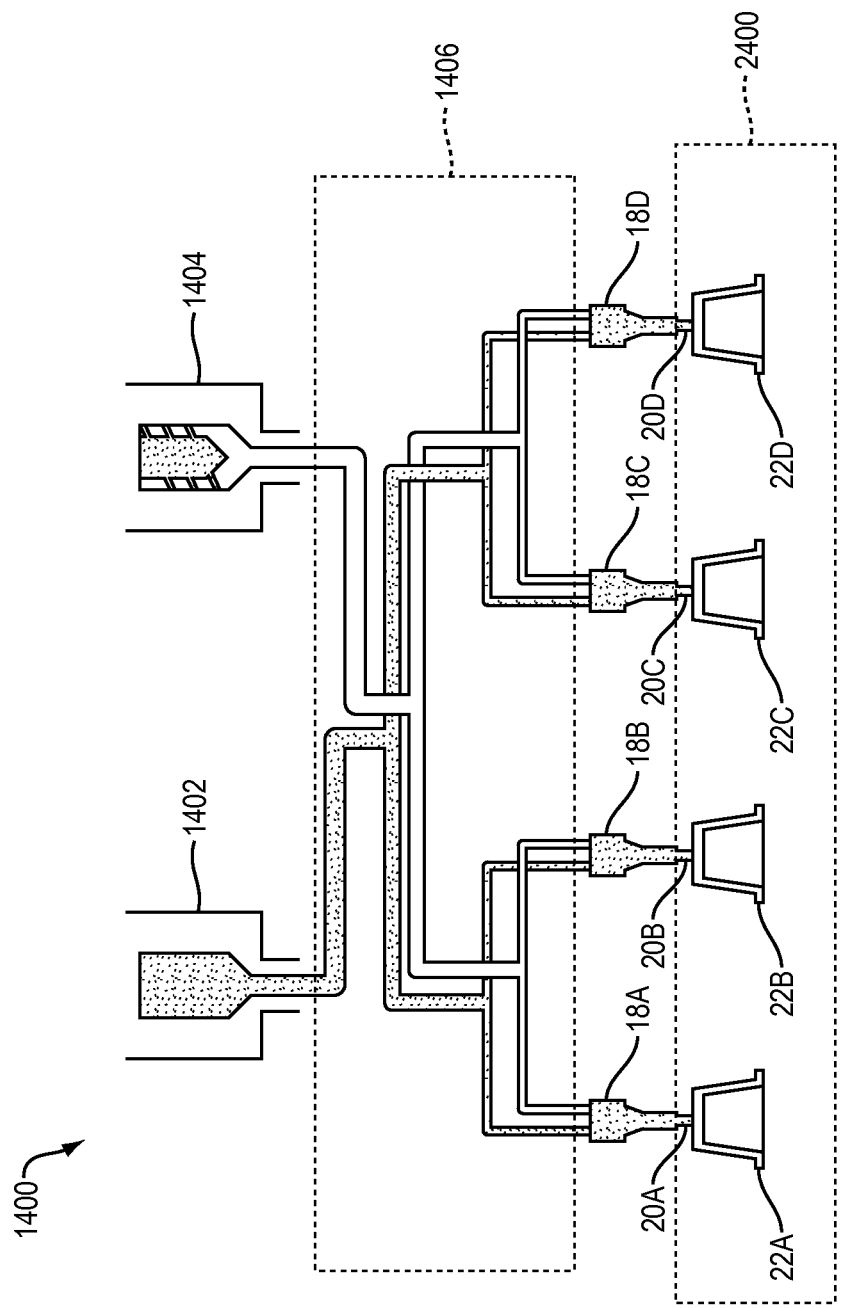
FIG. 22 is a cross-sectional view of a molding apparatus suitable for use in the methods described herein.

FIG. 22 illustrates an exemplary system suitable for practicing the present invention. Co-injection molding system 1400 is configured to inject at least two materials into a mold cavity. Materials suitable for use with the present invention include polymer based materials such as, polyethylene, PET, PEN, PP, EVOH, nylon, COCs, HDPE and polycarbonates. Co-injection molding system 1400 includes a first material source 1402, a second material source 1404, and a manifold 1406. Co-injection molding system 1400 further includes nozzle assemblies 18A-18D and mold 2400. Mold 24 includes gates 20A-20D, and cavities 22A-22D.

A first polymeric material is extruded from the first material source 1402 and a second polymeric material is extruded from the second material source 1404 into the manifold 1406 for combining in nozzles 18A-18D before being injected into mold cavities 22A-22D. The first and second polymeric streams are combined to form an annular combined polymeric stream such that the first polymeric material forms an interior core stream in the combined polymeric stream while the second polymeric material forms the inner and outer streams in the combined stream. The inner and outer streams encase the interior core stream as the annular combined polymeric stream is injected from the nozzle. In some embodiments, the first material source 1402 may have an associated first injection unit that controls an injection velocity of the first material, the second material source 1404 may have an associate second injection unit that controls and injection velocity of the second material, or both.

In certain other embodiments, the volumetric ratio of the interior layer to the sum of the inner and outer layers may be intentionally adjusted or modulated so that different portions of the interior core stream edge flow along different streamlines having different velocities. As the composite stream flows along a mold pathway, a portion of the interior core stream edge flowing along a faster streamline will catch up with and pass an earlier portion of the interior core stream flowing along a slower streamline forming a cohesion member. The variation or modulation in interior layer thickness can be intentionally created in various ways, which include through controlled pulsation of the flow rate of the interior layer relative to the flow rate of the inner layer and the flow rate of the outer layer. In some embodiments, the variation or modulation in interior layer thickness can be created using the relative differences in viscosity between the material of the interior core stream and the material of the inner and outer streams in combination with abrupt changes in flow geometry intentionally selected to create pulsations in the core stream flow downstream of the abrupt change in geometry.

For example, controlled pulsation of a flow rate of an interior core stream relative to a flow rate of the inner stream, relative to a flow rate of the outer stream or relative to both will produce variations in thickness of the interior core stream, and the corresponding interior core layer, over time, with a higher relative flow rate of the interior core stream producing a thicker interior core stream portion and a lower relative flow rate of the interior core stream producing a thinner interior core stream portion. The pulsation in the flow rate can be created by changes in the injection rate of the interior layer compared to the injection rate of the inner layer, compared to the injection rate of the outer layer, or compared to the injection rate of both layers. In some embodiments, the injection rate of the interior core stream relative to the injection rate of the inner and outer streams can be controlled by rapidly changing the injection velocity of a first injection unit supplying a first material for the inner and outer streams, by rapidly changing the injection velocity of a second injection unit supplying a second material for the interior core stream, or by rapidly changing both. In some embodiments, the injection rate of the internal core stream relative to the injection rate of the inner stream and/or the injection rate of the outer stream can be controlled by rapidly changing the flow resistance within the nozzle to change the flow rate of the interior layer entering the cavity. For example, a flow restrictive valve pin in a nozzle may be rapidly oscillated to rapidly change a flow resistance of the interior core stream relative to that of the inner stream and/or relative to that of the outer stream.

In some embodiments, an abrupt change in geometry of a mold along a flow path may be employed to create oscillations in a thickness of an interior flow stream due to differences in the viscoelasticity of a second material for the interior flow stream and that of the a first material of the inner and outer flow streams. The viscoelastic differences between the second material of the interior core stream and the first material of the interior core stream combined with rapid changes in flow geometry produce pulsations of relatively shorter wavelength than those obtained by variation of a relative injection rate. For example, pulsations wavelengths of less than 1.0 mm have been produced downstream of changes in cavity geometry which, over a flow distance of 1.0 mm, first decreased the combined flow shear rate by a factor of 4 and then increased it by a factor of 1.2. The amplitude of the pulsations may be reduced or increased by changes in flow rate, relative material temperature and mold temperature.

Regardless of how the thickness variations in the interior flow stream are created, due to the thickness variations, various portions of an outer edge of the interior flow stream flow at different velocities along different streamlines, leading to some portions of the outer edge to catch up with or overlap other portions of the outer edge creating one or more cohesion members.

For example, FIGS. 23 and 24 schematically depict cross-sectional view of a composite stream 1510 flowing along a mold pathway 1500. FIG. 23 shows the flow of the composite stream 1510 during the filling phase of injection. In this embodiment an interior core stream 1520 flows along a zero gradient velocity streamline 1505. The interior core stream 1520 includes pulsations in thickness. Due to the pulsations in thickness, the interior core stream has outer edges 1524 and 1526 with different portions of the outer edge lying along different streamlines with different velocities.

For reference, a streamline velocity profile 1540 and arrows indicating relative velocity 1540a, 1540b for various offsets from the zero-gradient velocity streamline are overlaid on the cross-sectional view. The streamline velocity profile 1540 has a maximum at the zero gradient velocity streamline 1505 and goes to zero at the solidified layer 1512 at the periphery of the mold pathway 1540 behind the flow front 1514. The outer edges of the interior core stream each have a first portion 1524a, 1526a disposed on the 1540a streamline in the narrower portion of the interior core stream 1520 and a second portion 1524b, 1526b disposed on the wider portion of the interior core stream on streamlines that are further from the zero gradient velocity streamline (e.g., the 1540b streamline). As shown by the streamline velocity profile 1540 in FIG. 23, the 1540b streamline of the second portion 1524b, 1526b is only a little slower than the 1540a streamline of the first portion 1524a, 1526a. This relatively small difference in velocity for the 1540a and 1540b streamlines does not significantly distort the shape of the pulses in the interior core stream 1520.

FIG. 24 shows the same composite stream 1510 in the mold pathway 1500 at a later time near the end of the packing phase During the filling phase, the fastest streamline travels at a relatively high velocity (e.g., 100 mm/s). In contrast, during the packing phase, the fastest streamline travels at a much lower velocity (e.g., 5 mm/s). As shown, the streamline velocity profile 1540 has also changed in shape during the packing phase. The solidified layer 1512 occupies more of the mold pathway 1500 creating a profile with a larger gradient in velocity between the 1540a streamline and the 1540b streamline. The first portion of the interior core stream outer edge 1524a, 1526a flowing along the 1540a streamline flow significantly faster than the second portion 1524b, 1526b flowing along the 1540b streamline. As shown in FIG. 24, the first portion 1524a, 1526a, flows beyond the second portion 1524b, 1526b forming a cohesion member 1550. The first portion 1524a and second portion 1524b physically interlock the interior core layer with one layer of the resulting article. The first portion 1526a and second portion 1526b of the other outer edge of the interior stream interlock the interior core layer with another layer of the resulting article. The length of the structural member 1550 is the distance over which portions of the outer edge 1524, 1526 overlap, which is indicated by $L_{PSM}$. The spacing or wavelength between pulsations or structural members is labeled $S_{PSM}$.

In some embodiments, the interior stream is not centered on the fastest streamline. For example, FIGS. 25 and 26 schematically depict cross-sectional views of a composite stream 1610 flowing along a mold pathway 1600 with an interior core stream 1620 that is not centered on the zero-gradient velocity streamline 1605. FIG. 25 shows the flow of the composite stream 1610 during the filling phase. In this embodiment an interior core stream 1520 flows along a zero gradient velocity streamline 1605. The interior core stream 1620 includes pulsations 1523 in thickness. The interior core stream has a first outer edge 1624 and a second outer edge 1626. For each outer edge 1624, 1626, due to the pulses in thickness, different portions of the outer edge lie along different streamlines with different velocities.

For reference, a streamline velocity profile 1640 and arrows indicating relative velocity 1640a, 1640b, 1640c, 1640d, for various offsets from the zero-gradient velocity streamline 1605 are overlaid on the cross-sectional view. The streamline velocity profile 1640 has a maximum at the zero gradient velocity streamline 1605 and goes to zero at the solidified layer 1612 at the periphery of the mold pathway 1640 behind the flow front 1614. The first outer edge 1624 of the interior core stream has a first portion 1624c disposed on the 1640c streamline and a second portion 1624d disposed on the 1640d streamline. The second outer edge 1626 of the interior core stream has a first portion 1626a disposed on the 1640a streamline and a second portion 1626b disposed on the 1640b streamline. As shown in FIG. 25, there is only a small velocity difference between the 1640a streamline and the 1640b streamline. The velocity difference between the 1640c and 1640d streamlines is even smaller. The gradient in velocity is not sufficient to substantially distort the pulsed shaped of the interior core stream 1620 on either the first outer edge 1624 or the second outer edge 1626.

FIG. 26 shows the same composite stream 1610 in the mold pathway 1600 at a later time during the packing phase of injection. As noted above, during the packing phase the fastest streamline travels at a much slower velocity than it does during the filling phase. As shown, the streamline velocity profile 1640 has also changed in shape during the packing phase. The solidified layer 1612 occupies more of the mold pathway 1600 creating a profile with a substantially larger gradient in velocity between the 1640a streamline and the 1640b streamline. Due to the large difference in velocity between the first portion 1626a traveling along the 1640a streamline and the second portion 1626b traveling along the 1640b streamline, the second outer edge 1626 has been distorted with the first portion 1626a flowing beyond the second portion 1624b to form a cohesion member 1650 that physically interlocks the core layer of the resulting article with the layer in contact with the second outer edge.

However, the velocity of the second portion 1624d of the second outer edge traveling along the 1640d streamline is only slightly smaller than the velocity of the first portion 1624c of the second outer edge traveling along the 1640c streamline. This relatively small difference is velocity is insufficient to distort the first outer edge 1624 of the interior core stream. Thus, the first outer edge 1624 does not physically interlock the core layer of the resulting article with the layer in contact with the first outer edge.

Figure 27:
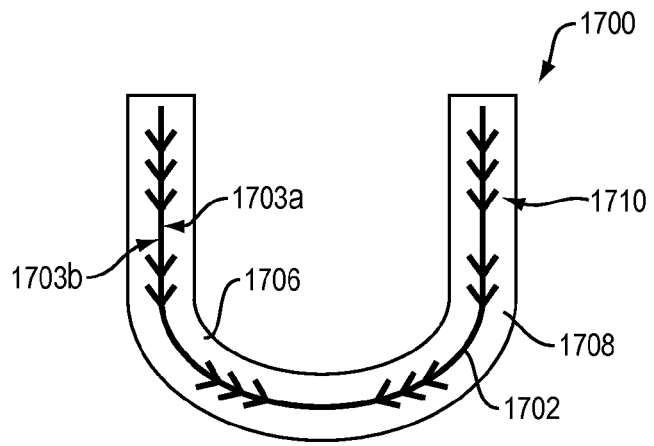
FIG. 27 is a schematic cross-sectional view of a resulting article having a structural barrier layer that physically interlocks with both an inner layer and an outer layer of the article, in accordance with an embodiment.

FIG. 27 schematically depicts a multi-layer injection molded article 1700 with an inner layer 1706 and an outer layer 1708 of a first polymeric material and an interior core layer 1702 of a second polymeric material having a configuration that physically interlocks with both the inner layer 1706 and the outer layer 1708, in accordance with some embodiments. The interior core layer 11702 is disposed between the inner layer 1706 and the outer layer 1708. A first outer edge 1703a of the interior core layer and a second outer edge 1703b of the interior core layer are intentionally configured to form cohesion members 1710. Each cohesion member 1710 structurally interlocks the core layer 1702 with both the inner layer 1706 and the outer layer 1708. At a cohesion member 1750, the first outer edge 1703a structurally interlocks the interior core layer 1702 with the inner layer 1706. At the cohesion member, the second outer edge 1703b structurally interlocks the interior core layer 1702 with the outer layer 1708.

Figure 28:
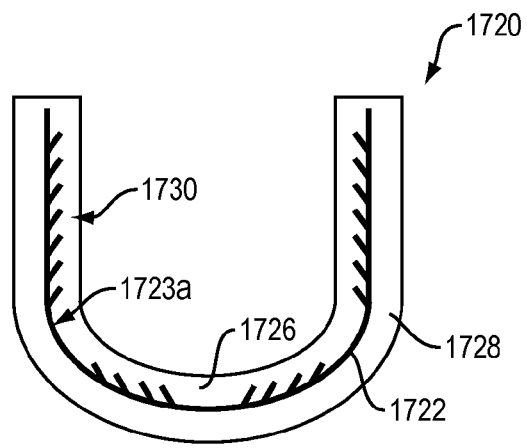
FIG. 28 is a schematic cross-sectional view of a resulting article having a structural barrier layer that physically interlocks with an inner layer of the article, in accordance with an embodiment.

FIG. 28 schematically depicts a multi-layer injection molded article 1720 with an inner layer 1726 and an outer layer 1728 of a first polymeric material and an interior core layer 1722 of a second polymeric material having a configuration that physically interlocks with the inner layer 1726, in accordance with some embodiments. The interior core layer 1722 is disposed between the inner layer 1726 and the outer layer 1728. A first outer edge 1723a of the interior core layer is intentionally configured to form cohesion members 1730. Each cohesion member 1730 structurally interlocks the interior core layer 1722 with the inner layer 1726 and the outer layer 1728. At a cohesion member 1750, the first outer edge 1703a structurally interlocks the interior core layer 1722 with the inner layer 1706.

Figure 29:
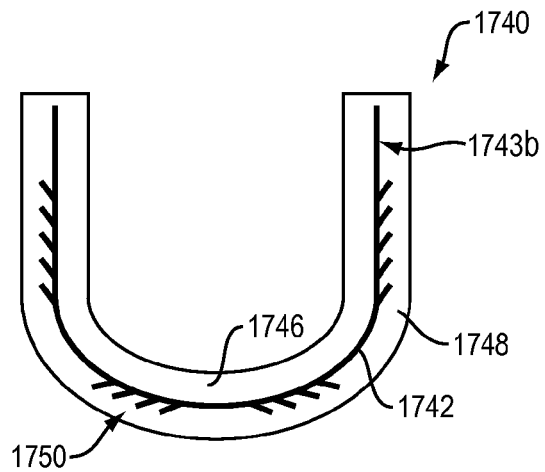
FIG. 29 is a schematic cross-sectional view of a resulting article having a structural barrier layer that physically interlocks with an outer layer of the article, in accordance with an embodiment.

FIG. 29 schematically depicts a multi-layer injection molded article 1740 with an inner layer 1746 and an outer layer 1748 of a first polymeric material and an interior core layer 1742 of a second polymeric material having a configuration that physically interlocks with the outer layer 1748, in accordance with some embodiments. The interior core layer 1742 is disposed between the inner layer 1746 and the outer layer 1748. An outer edge 1743b of the interior core layer is intentionally configured to form cohesion members 1750. Each cohesion member 1750 structurally interlocks the interior core layer 1742 with the outer layer 1746 and the outer layer 1758. At a cohesion member 1750, the first outer edge 1703a structurally interlocks the interior core layer 1702 with the inner layer 1706.

In some embodiments, an article may have a combination of different types of cohesion members. For example, an article may have any combination of pulse-formed cohesion members that interlock with the inner layer, pulse-formed cohesion members that interlock with the outer layer, and cohesion members that interlock with both the inner layer and the outer layer. In some embodiments, an article may have a combination of pulse-formed cohesion members and cohesion members formed from shifting the streamline of the interior core stream (e.g., a single dog leg configuration or a double dog leg configuration.

Figure 30:
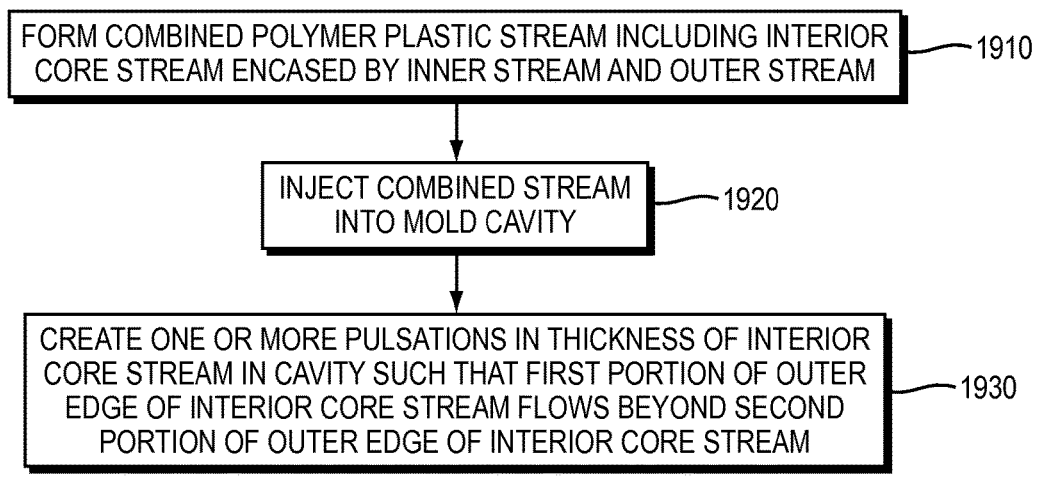
FIG. 30 is a flow chart schematically depicting a method for producing exemplary plastic articles using the methods and systems described herein, in accordance with some embodiments.

FIG. 30 schematically depicts a method 1900 of co-injection molding a multilayer plastic article having a plurality of cohesion members, in accordance with some embodiments. In method 1900, a combined polymer plastic stream is formed in an injection nozzle (step 1910). The combined stream includes an interior core stream of a first polymeric material encased by an inner stream of a second polymeric material and an annular outer stream of the second polymeric material. The combined stream is injected into a mold cavity (step 1920). One or more pulsations are created in a thickness of the interior core stream in the cavity such that a first portion of an outer edge of the interior core stream flows beyond a second portion of the outer edge of the interior core stream thereby forming one or more cohesion members that physically interlock an interior layer of the resulting molded plastic article formed from the interior core stream with an inner layer of the of the resulting article, with an outer layer of the resulting article, or with both.

In some embodiments, the one or more pulsations in the thickness of the interior core stream are created before the combined stream exits the nozzle.

In some embodiments, the one or more pulsations in the thickness of the interior core stream are created within the cavity. For example, in an embodiment in which the first material has a viscoelasticity different than the viscoelasticity of the second material, the cavity may have at least one abrupt transition in geometry along the flow path selected to interact with the viscoelastic difference between the first material and the second material to create the one or more pulsations in the thickness of the interior core stream IV. Equivalents Those skilled in the art will recognize, or be able to ascertain using no more than routine experimentation, many equivalents to the specific embodiments of the invention described herein. Such equivalents are intended to be encompassed by the following claims. All figures are offered by way of illustration, not by way of limitation. While specific examples have been provided, the descriptions are illustrative and not restrictive. Any one or more of the features of the previously described embodiments can be combined in any manner with one or more features of any other embodiments in the present disclosure. Furthermore, many variations of the present disclosure will become apparent to those skilled in the art upon review of this disclosure.

The invention claimed is:

1. A method of co-extruding a plurality of polymeric plastic material streams to produce a resulting molded plastic article, the method comprising the steps of:
    forming a combined polymeric plastic stream in an injection nozzle, the combined stream comprising an interior core stream of a first polymeric material encased by an inner stream of a second polymeric material and an outer stream of the second polymeric material;
    injecting the combined stream into a mold cavity; and
    creating one or more controlled pulsations in a thickness of the interior core stream in the cavity such that a first portion of an outer edge of the interior core stream flows beyond a second portion of the outer edge of the interior core stream thereby forming a plurality of cohesion members, wherein at least a first one of the plurality of cohesion members physically interlocks an interior layer of the resulting molded plastic article formed from the interior core stream with an inner layer of the resulting molded plastic article formed from the inner stream, and wherein at least a second one of the plurality of cohesion members physically interlocks the interior layer of the resulting molding plastic article formed from the interior core stream with an outer layer of the resulting molded plastic article formed from the outer stream.

2. The method of claim 1, wherein the one or more controlled pulsations in the thickness of the interior core stream are created by altering a flow rate of the interior core stream relative to a flow rate of the inner stream and relative to a flow rate of the outer stream.

3. The method of claim 2, wherein altering the interior core stream flow rate relative to the inner stream flow rate and relative to the outer stream flow rate comprises altering an injection velocity of a first injection unit supplying the first polymeric material to the nozzle, altering an injection velocity of a second injection unit supplying the second polymeric material to the nozzle, or both.

4. The method of claim 2, wherein altering the interior core stream flow rate relative to the inner stream flow rate and relative to the outer stream flow rate comprises altering, within the nozzle, a flow resistance for the interior core stream relative to a flow resistance for the inner stream and relative to a flow resistance for the outer stream.

5. The method of claim 1, wherein the first material has a viscoelasticity different than that of the second material, and wherein the cavity has at least one abrupt change in geometry selected to interact with the viscoelastic difference between the first material and the second material to create the one or more controlled pulsations in the thickness of the interior core stream downstream of the at least one change in geometry.

6. The method of claim 1, wherein the one or more controlled pulsations in the thickness of the interior stream are created before the combined stream exits the nozzle.

7. The method of claim 1, wherein a magnitude of a length (L) of the first one of the plurality of cohesion members is the same as or less than a magnitude of a local thickness (T) of the resulting article at the first one of the plurality of cohesion members.

8. The method of claim 1, wherein the first polymeric material comprises ethyl vinyl alcohol (EVOH) and the second polymeric material comprises polypropylene.

9. The method of claim 1, wherein the viscosity of the interior core stream falls in the range of 40-400 Pa-sec.

10. The method of claim 1, wherein a cosmetic effect is formed in the resulting molded plastic article by the creation of the one or more controlled pulsations in the interior core stream.

11. The method of claim 1, wherein a color of the interior core stream is visually distinguishable in the resulting molded plastic article.

12. The method of claim 1, wherein the first polymeric material and the second polymeric material are substantially free of adhesive.

13. The method of claim 1, wherein the plurality of cohesion members are formed during a filling phase of a molding cycle.

14. The method of claim 1, wherein the plurality of cohesion members are formed during a packing phase of a molding cycle.

15. The method of claim 1, wherein the plurality of cohesion members are formed during a filling phase and during a packing phase of a molding cycle.

* * * * *